(12) United States Patent
Garrett et al.

(10) Patent No.: US 11,674,878 B2
(45) Date of Patent: Jun. 13, 2023

(54) DIFFERENTIAL EMISSIVITY BASED EVAPORABLE PARTICLE MEASUREMENT

(71) Applicant: University of Utah Research Foundation, Salt Lake City, UT (US)

(72) Inventors: Tim Garrett, Salt Lake City, UT (US); Dhiraj Kumar Singh, Salt Lake City, UT (US); Karlie Rees, Salt Lake City, UT (US); Eric Pardyjak, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 363 days.

(21) Appl. No.: 17/106,031

(22) Filed: Nov. 27, 2020

(65) Prior Publication Data
US 2021/0172855 A1    Jun. 10, 2021

Related U.S. Application Data

(60) Provisional application No. 62/941,665, filed on Nov. 27, 2019.

(51) Int. Cl.
*G01N 15/14* (2006.01)
*G01N 9/02* (2006.01)
*G01N 15/10* (2006.01)

(52) U.S. Cl.
CPC .......... *G01N 15/1429* (2013.01); *G01N 9/02* (2013.01); *G01N 2015/1043* (2013.01); *G01N 2015/1087* (2013.01)

(58) Field of Classification Search
CPC .......... G01N 15/1056; G01N 15/1429; G01N 15/1468; G01N 2009/024; G01N 2015/0026; G01N 2015/1043; G01N 2015/1087; G01N 2015/1093; G01N 9/02; G01W 1/14
See application file for complete search history.

(56) References Cited

U.S. PATENT DOCUMENTS

| | | | |
|---|---|---|---|
| 4,333,004 A | 6/1982 | Forgue et al. | |
| 5,504,577 A | 4/1996 | Loimqvist et al. | |
| 5,567,865 A * | 10/1996 | Hauf ................. | G01P 5/12 |
| | | | 73/28.01 |
| 5,744,711 A | 4/1998 | Rasmussen et al. | |
| 5,790,026 A | 8/1998 | Lardiere, Jr. et al. | |
| (Continued) | | | |

FOREIGN PATENT DOCUMENTS

| CN | 104408729 A | 3/2015 |
|---|---|---|
| CN | 204695399 U | 10/2015 |
| (Continued) | | |

OTHER PUBLICATIONS

Rees et al.; "A new particle-by-particle hot plate technique for measurement of precipitation rate, snow density and visibility." EGU General Assembly 2020, Online, May 4-8, 2020; 1 Page.

(Continued)

*Primary Examiner* — Yoshihisa Ishizuka
(74) *Attorney, Agent, or Firm* — Thorpe North & Western, LLP

(57) ABSTRACT

A differential emissivity imaging device for measuring evaporable particle properties can include a heated plate, a thermal camera, a memory device, and an output interface. The heated plate can have an upper surface oriented to receive falling evaporable particles. The evaporable particles have a particle emissivity and the upper surface has a plate surface emissivity. The thermal camera can be oriented to produce a thermal image of the upper surface. A memory device can include instructions that cause the imaging device to calculate a mass of the individual evaporable particle via heat conduction using a calculated surface area and an evaporation time.

16 Claims, 21 Drawing Sheets

(56) References Cited

U.S. PATENT DOCUMENTS

| | | | |
|---|---|---|---|
| 6,546,353 | B1 | 4/2003 | Hallett et al. |
| 7,122,820 | B2 | 10/2006 | Engel et al. |
| 7,249,502 | B2 | 7/2007 | Luukkala et al. |
| 7,472,590 | B2 | 1/2009 | Solheim et al. |
| 8,891,895 | B2 | 11/2014 | Garrett et al. |
| 10,026,163 | B2 | 7/2018 | Fallgatter et al. |
| 10,359,514 | B2 | 7/2019 | Hagerman et al. |
| 2007/0263696 | A1 | 11/2007 | Kjoller et al. |
| 2007/0273394 | A1 | 11/2007 | Tanner et al. |
| 2014/0007654 | A1 | 1/2014 | Lillie et al. |
| 2016/0247273 | A1 | 8/2016 | Fallgatter et al. |
| 2016/0327687 | A1 | 11/2016 | Nylander et al. |
| 2017/0075034 | A1 | 3/2017 | Kleeman et al. |
| 2017/0341485 | A1 | 11/2017 | Yoneda et al. |

FOREIGN PATENT DOCUMENTS

| | | |
|---|---|---|
| WO | WO 2006/067513 A1 | 6/2006 |
| WO | WO 2013/124853 A1 | 8/2013 |
| WO | WO 2015/167914 A1 | 11/2015 |
| WO | WO 2019/075484 A1 | 4/2019 |

OTHER PUBLICATIONS

PCT Application No. PCT/US20/62514, Filing date Nov. 27, 2020, Tim Garrett International Search Report dated Jun. 9, 2021; 14 Pages.

Ma et al.; "Wireless Remote Weather Monitoring System based on MEMS Technologies." Sensors (Basel), Mar. 1, 2011; pp. 2715-2727.

Praz et al.; "Solid Hydrometeor classification and riming degree estimation from pictures collected with a Multi-Angle Snowflake Camera." Atmos. Meas. Tech., 10, 1335-1357, 2017.

Smith et al.; "Measuring Cloud Cover and Brightness Temperature with a Ground-Based Thermal Infrared Camera." Journal of Applied Meteorological Society; Feb. 2008; vol. 47; pp. 683-693.

* cited by examiner

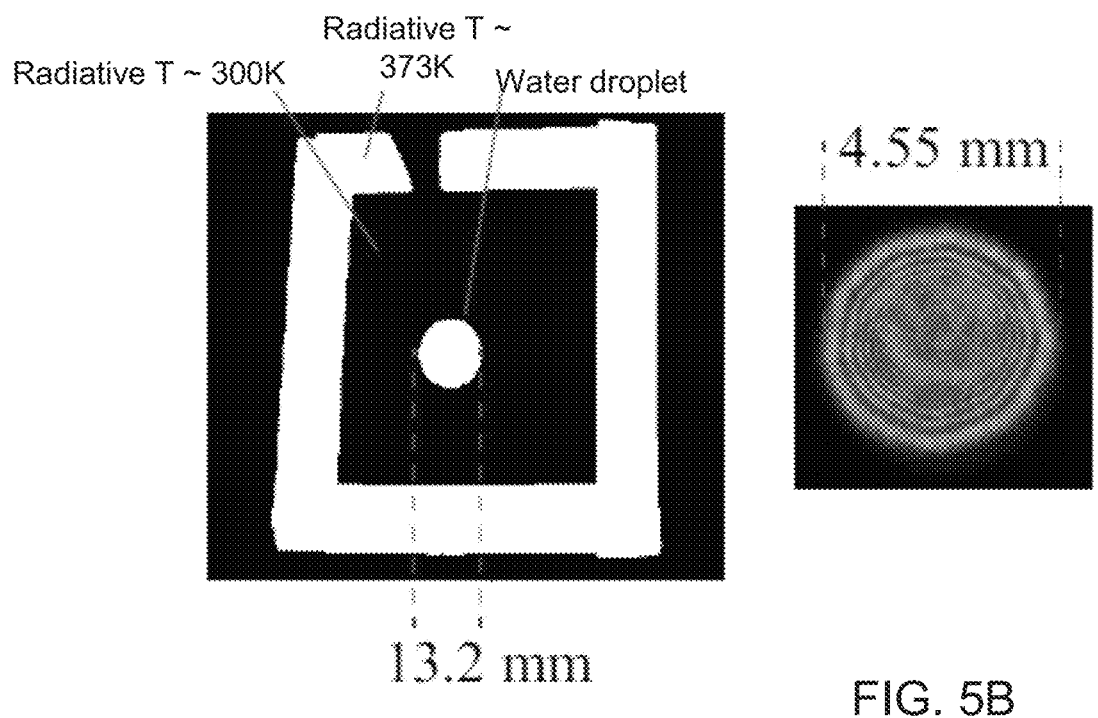
FIG. 5A
FIG. 5B
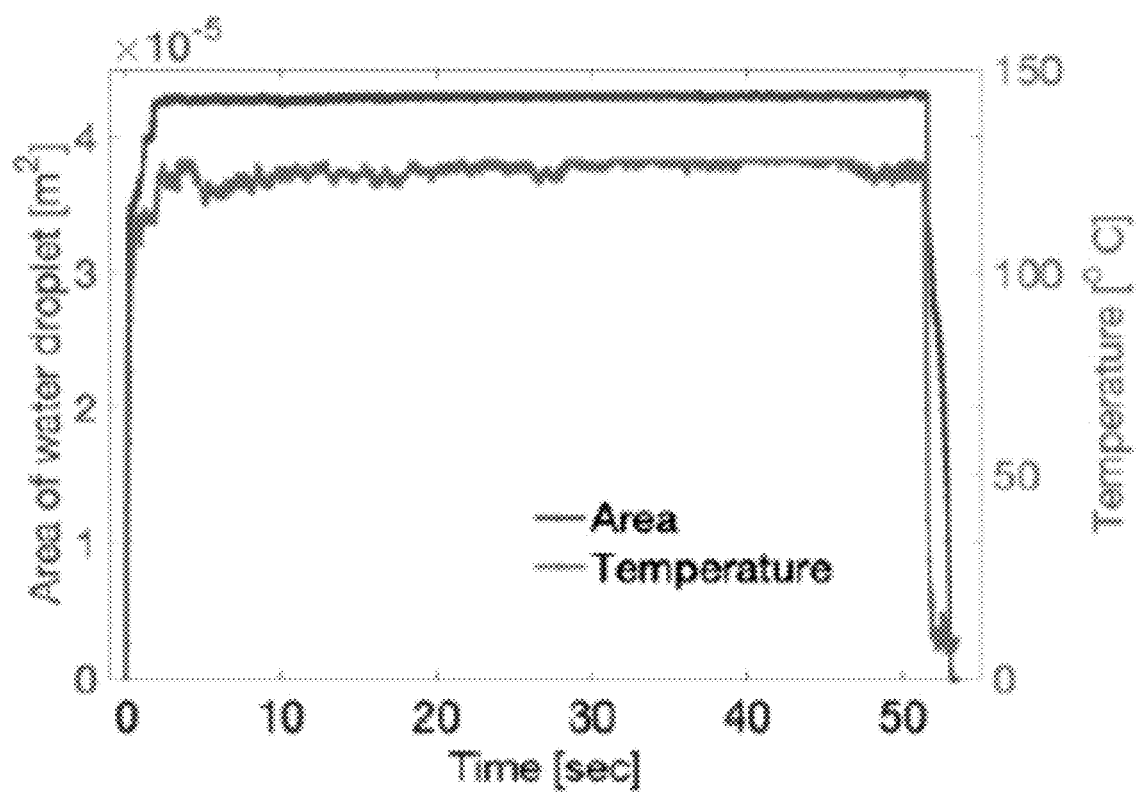
FIG. 5C

DIFFERENTIAL EMISSIVITY BASED EVAPORABLE PARTICLE MEASUREMENT

RELATED APPLICATION

This application claims priority to U.S. Provisional patent Application No. 62/941,665, filed Nov. 27, 2019, entitled "Differential Emissivity Based Evaporable Particle Measurement" and which is incorporated herein by reference.

GOVERNMENT INTEREST

This invention was made with government support under Grant No. DE-SC0017168 awarded by the U.S. Department of Energy. The government has certain rights in the invention.

BACKGROUND

Statistics for hydrometeor particle mass are an important factor for meteorological and climatological diagnosis and prediction. The precipitation flux, a lynchpin of the water cycle, is the product of hydrometeor mass and fallspeed integrated over all falling particles. No existing technique is available to accurately and automatically measure these properties. In the case of liquid rain particles, the problem is simplified by the particles being a continuous fluid of near spherical shape. Simplified imaging and light scattering technologies work with some fidelity. However, this is not the case for frozen and semi-frozen particles whose internal density can range from 1% to near 100% of the liquid value with little understanding or knowledge of the meteorological factors controlling this variability. Light scattering technologies also do not see the interior of particles and therefore cannot estimate mass from visible wavelength cross-sections without making a wide range of assumptions which can compromise results in certain circumstances.

Many studies have measured the shape, size, fall velocity, and precipitation rate of hydrometeors. Accurate measurement of these parameters is highly desirable for many applications, including scientific, industrial, commercial and weather predictions. Ground based instruments, weighing gauge, and optical gauge are accessible for measurements of precipitation rate and accumulation of snow and rain. Weighing gauges are based on collection of snow/rain in a container or on the surface. Transportation agencies charged with public safety have relied on weighing gauges with collection buckets that have open orifices. These weighing gauges usually require troublesome anti-freeze additives with a glycol-based solution and oil skim overlays to prevent evaporation of water from the solution. Further, some gauges require manually emptying during a storm. Optical gauges can measure the size and volume of the hydrometeors in free fall cases and can work well for rain but not very well for snow due to wide variations in density and difficulties in measuring accurately (e.g. 10 kg m-3 to 600 kg m-3 for freshly fallen snow). Current techniques produce significant variation in measurement of snow water equivalent (SWE) and snow precipitation rate due to huge variations of density of snow.

There are many instruments in use to measure the precipitation rate, fall speed, size distribution, and visibility such as the hotplate precipitation gauge, MASC, 2DVD, and PARSIVEL. However, none of these instruments measure the physical properties of individual hydrometeors such as mass and density, which is important for measurement of depth of snow, precipitation rate of snow and effect of turbulence in fall velocity etc. The role of atmospheric turbulence on falling hydrometeors is important for global and regional precipitation rate. The atmospheric turbulence effect on falling hydrometeors is dependent on the properties of an individual particle including size, physical cross-sectional area, density, and mass.

SUMMARY

A differential emissivity imaging device can be used to measure mass and density. Mass measurement can be achieved using a hotplate device imaged with a thermal IR camera. The hotplate can be maintained at temperature of ~110° C., which is below the Leidenfrost point where heat transfer to hydrometeors that impact the plate is maximized. The plate can be made of a low-emissivity metal and can be microscopically roughened to accelerate the evaporation rate. The plate can be imaged by a high-resolution thermal IR camera. Hydrometeors are high emissivity so they show up as bright spots on the plate superimposed on a black background. The hydrometeor evaporation time (i.e. the time for a spot to disappear) is measured and can be related to the hydrometeor mass through known physics for heat transfer from a high temperature boundary into a body of liquid or ice. The relationship between the size of the spot and the mass can be used to discriminate hydrometeor phase, e.g. to differentiate snow from rain. More generally, any fluid medium which is transmissive to thermal radiation including an emissive evaporable particle flux normal to an arbitrarily oriented thermally reflective hotplate (e.g. metal or some other substance) can be used.

More specifically, a differential emissivity imaging device for measuring evaporable particle properties can include a heated plate, a thermal camera, a memory device, and an output interface. The heated plate can have an upper surface oriented to receive falling evaporable particles. The evaporable particles have a particle emissivity and the upper surface has a plate surface emissivity. The thermal camera can be oriented to produce a thermal image of the upper surface. At least one memory device can include instructions that, when executed by at least one processor, cause the imaging device to: identify individual evaporable particles from the thermal image by differences between the particle emissivity and the plate surface emissivity, determine a plate surface radiative temperature and a droplet radiative temperature as a function of a time until the droplet is evaporated, determine a surface area of the droplet, and calculate a mass of the individual evaporable particle via heat conduction using the surface area and the time. The output interface can communicate the evaporable particle properties to an output device, where the evaporable particle properties include the mass.

It has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1A is a schematic of heat flow between the series combination of the hotplate and water droplet at quasi static condition. FIG. 1B illustrates a distribution of heat gain and loss from the water droplet.

FIG. 2 is a schematic of the device where a top surface of the hotplate is a roughened metal plate with low emissivity. A thermal camera view shows hydrometeors as appearing dark in the air before falling on the hotplate due to their low temperature and high emissivity. The hotplate without hydrometeors looks dark due to its low emissivity and high temperature. After hydrometeors fall on the hotplate, they look bright due to high emissivity and high temperature. This creates a large contrast that enables the measurement of the hydrometeors size and area by counting pixels. Roughness of the hotplate tends to accelerate the evaporation, reduce deformation after impact (shear force) and maintain the shape of a solid hydrometeor after melting at 0° C. The contact angle (c) is less for a roughened surface. One example range of temperature of the hotplate can be 100° C. to 120° C. (depending on fall rate of hydrometeors). Temperature may be controlled using any suitable feedback control (e.g. PID or the like), feedforward control, ratio control, cascade control, combinations thereof, and the like.

FIGS. 5A-C show mass measured by the device was validated by comparing against direct mass measurements using micro-pipetted droplets of known mass in the laboratory.

FIG. 1A shows how a water droplet is identified by the contrast between the dark background and bright spot due to differential emissivity of the materials to allow the area of droplet to be measured. Radiative temperature of the hotplate (background) is 300 K due to low emissivity (0.2) and the radiative temperature (bright spot) of the top of the droplet is 373 K due to high emissivity of water (0.98). FIG. 5B is an image of water droplet taken in air just before impact on the hotplate to validate the mass measurement. FIG. 5C is a graph of area of the droplet on the hotplate as a function of time during evaporation.

FIG. 12A shows mean density of snow particles, SWE fall rate, snowfall rate, and a fraction of area of snow occupied on the hotplate is 95 kg/m3, 2.5 mm/hr, 26.3 mm/hr and 0.03, respectively. FIG. 12B shows mean density of snow particles, SWE fall rate, snowfall rate, and a fraction of area of snow occupied on the hotplate at 82 kg/m3, 1.4 mm/hr, 17.06 mm/hr and 0.02, respectively. FIG. 12C shows the mean density of snow particles, SWE fall rate, snowfall rate, and a fraction of area of snow occupied on the hotplate at 260 kg/m$^3$, 1.5 mm/hr, 5.76 mm/hr and 0.014, respectively. FIG. 12D shows mean density of snow particles, SWE fall rate, snowfall rate, and a fraction of area of snow occupied on the hotplate is 42 kg/m3, 6.28 mm/hr, 149.52 mm/hr and 0.03, respectively.

FIG. 16A is an image 0.4×0.3 m$^2$ field of view, path of snow particles is shown with four different color (white, red, green and cyan) and time interval between two color is 1/60 sec. FIG. 16B is a graph of fall speed measured with respect to size of the snow particles. FIG. 16C is a graph of PDF plotted for snow particles with bin size 0.2. FIG. 16D is a 1 min window of the sonic anemometer data showing wind velocity (blue line) and air temperature (red line).

FIGS. 17A-B show the propagation of temperature perturbations across the DEID during a 1-s interval.

Figure 1A:
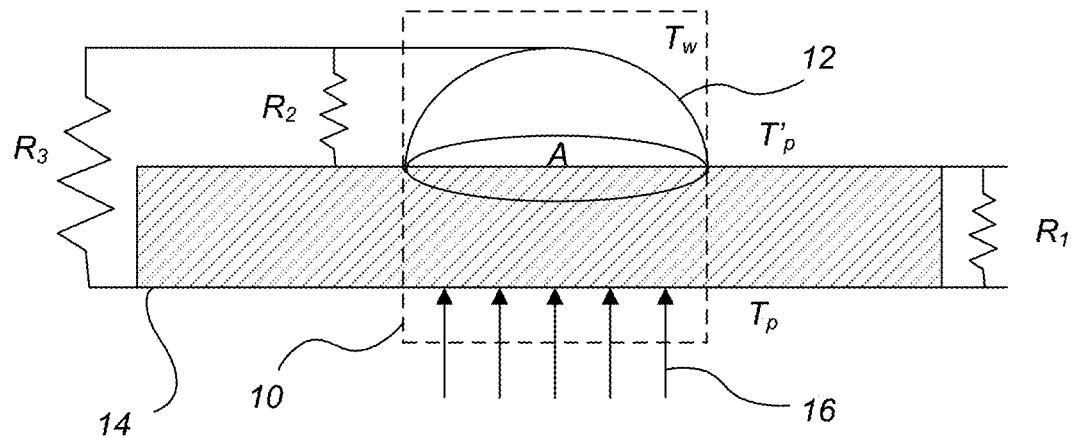
FIGS. 1A and 1B are schematics of an energy balance of a control volume across a water droplet.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and to describe the features and characteristics of the present invention to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a particle" includes reference to one or more of such materials and reference to "subjecting" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Differential Emissivity Imaging Device

Figure 2:
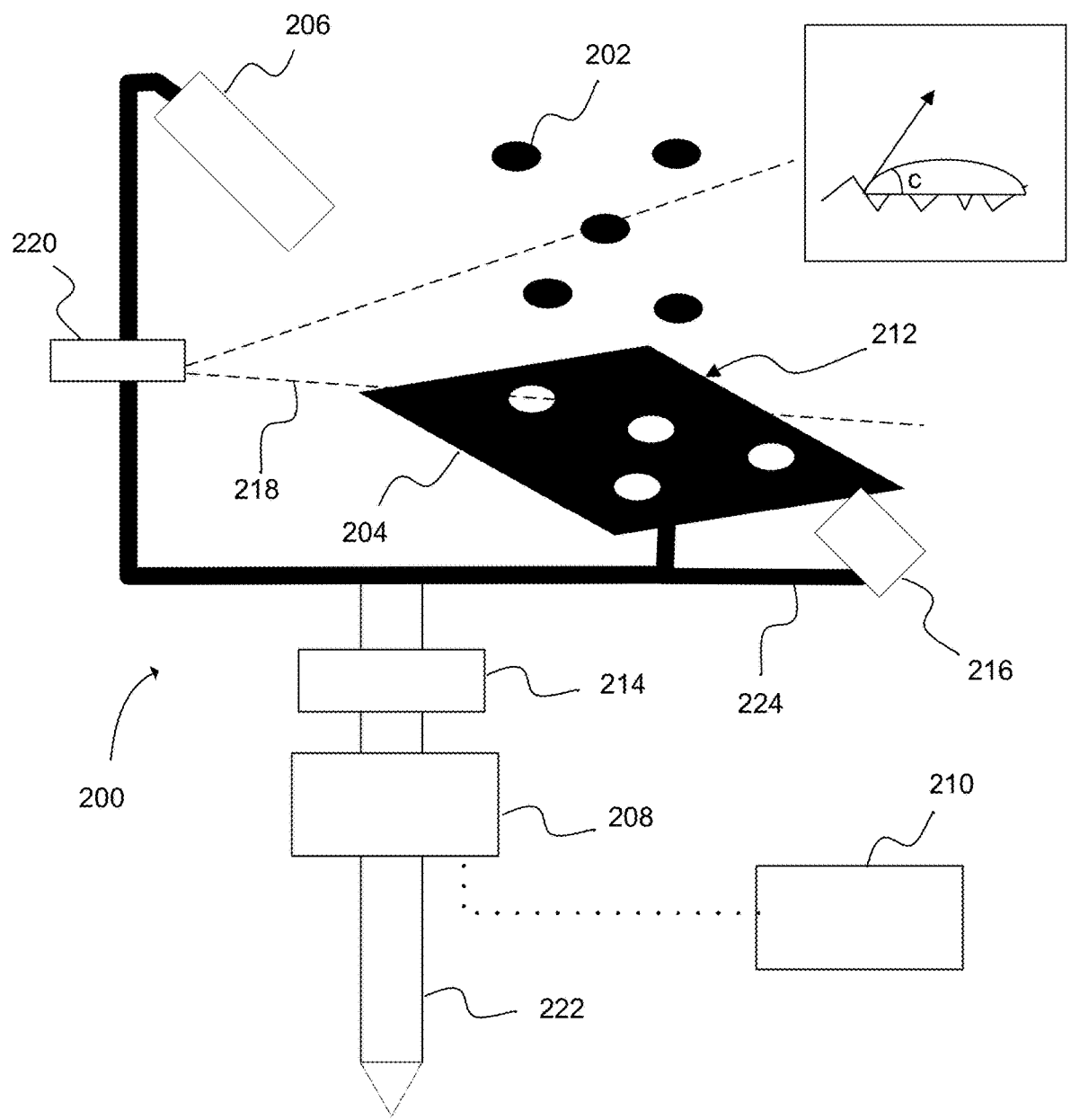

An evaporation-based optical and thermal instrument designed to measure the mass, size, density, type, and fall velocity of hydrometeors (i.e., snow, rain, and mixtures) is presented. This differential emissivity imaging disdrometer (DEID) includes a hotplate with a low emissivity top surface, a thermal camera, an optional laser sheet, and an optional SLR camera. The DEID can measure hydrometeors at sampling frequencies up to 0.5-20 Hz, and in some cases 0.5-1 Hz, with masses and sizes greater than 0.01 mg and 50 µm respectively with a resolution limited by the size of the hotplate and the thermal camera resolution. When a hydrometeor falls on the hotplate, the droplet evaporates and its mass is directly related to loss of heat from the hotplate, assuming energy conservation and that heat loss from the plate is only conductive and one dimensional. Physical dimensions of the droplets are measured on the hotplate using differential emissivity imaging where water/snow has high emissivity and the metal plate has comparatively low emissivity (FIG. 2). External environmental conditions (e.g., wind speed, air temperature, relative humidity and turbulence) can also be factored during use of these systems.

These systems and methods can also be effectively used with snow and rain-snow mixtures. Field experiment measurements of snow and rain show size distributions and precipitation rates that agree well with the canonical results obtained by Marshall-Palmer and Marshall-Gunn.

This system can measure the mass, shape, density, and size of individual hydrometeors based on heat loss from a hotplate. This system can also measure hydrometeors greater than 50 µm with a resolution which depends on the thermal camera lens which are improving constantly with time (e.g. 160×120, 320×240, etc).

Figure 1B:
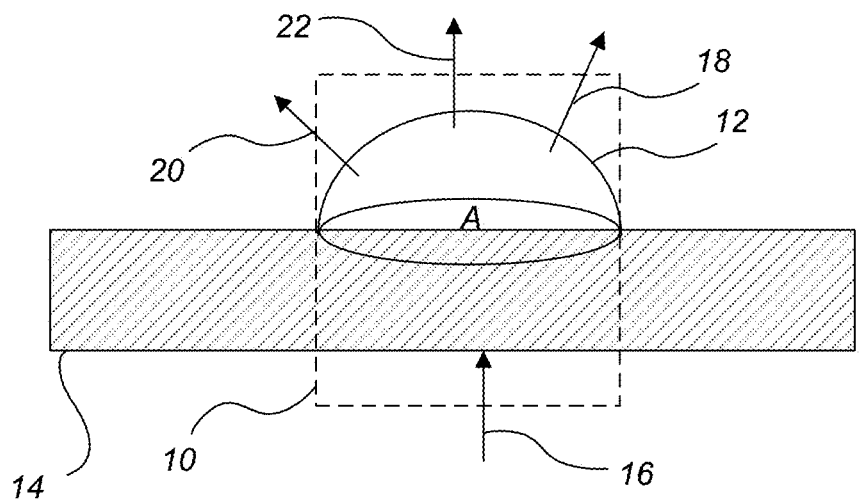

As background, the working principle of the DEID is based on conservation of thermal energy for a control volume 10 around a hydrometeor 12 as generally illustrated by FIGS. 1A and 1B. When a hydrometeor falls on the hotplate 14, the droplet evaporates (e.g. sublimate, melt and evaporate for snow particles) and its mass is directly related to loss of heat 16 from the hotplate assuming energy conservation and that heat loss from the plate is only conductive and one dimensional: Heat gain by water droplet=Heat loss from the hotplate for only evaporated water droplets. As shown in FIG. 1A, heat conduction can be described as a series combination of heat flow described by Equation 1.

$$\frac{T_p - T'_p}{R_1} = \frac{T'_p - T_w}{R_2} = \frac{T_p - T_w}{R_3} \quad (1)$$

where $T_p$ is the surface temperature of the plate, $T'_p$ is the surface temperature of the plate at an interface with the water droplet, $T_w$ is the temperature of a top surface of the water droplet, and $R_3 = K_{eq}/dA$.

Referring to FIG. 1B, the heat control volume 10 encompasses water droplet 12 and a portion of the hotplate 14. Energy stored plus evaporative energy loss 18 should equal conductive heat input 16 minus convective energy loss 20 (water to air) minus radiative energy loss 22 as described by Equation 2.

$$S\Delta T \int dm + L \int dm = \qquad (2)$$
$$\int_0^{\Delta t} (k/d)A(t)(T_p - T_w(t))dt - \int h_c A\Delta T - e\sigma bA(T_w^4 - T_{air}^4)$$

Where S is the specific heat capacity of water, ΔT is the temperature difference between the initial and final temperature of the water droplet, K is the thermal conductivity of the plate, d is the thickness of the plate, L is the latent heat of vaporization of water, A is the plan area of the droplet, $T_p(t)$ is the time taken to evaporate the water droplet, $T_w(t)$ is the temperature of the top surface of water droplet at time t, $T_{air}$ is the air temperature above the top surface, $h_c$ is heat transfer coefficient, e is emissivity of water, b is the view factor, σ is Stefan Boltzmann coefficient, and m is the mass of the water droplet. As an example, in Equation 2, the first term is energy stored by 125 the water droplet and heat capacity of water at 0° C. is 4.218×10³ J C⁻¹ kg⁻¹, the second term is heat required to evaporate and latent heat of vaporization is 2.260×10⁶ J kg⁻¹, the third term is total heat loss from the hotplate across the water droplet that is directly measured using thermal camera and k/d is ratio of equivalent thermal conductivity and equivalent thickness of the hotplate and water droplet. Further, the fourth term is energy loss from the water droplet to air by convection and using $h_c$ as 10.5 Wm⁻²K' (based on thermal conductivity of air, the diameter of a water droplet, and wind velocity) this energy loss is 1% of the total incoming energy from the hotplate (i.e. fifth term) is radiative energy loss from water droplet and this energy loss is 1% of the total incoming energy from the hotplate. Regarding all uncertainty in energy loss or gain between the hotplate and water droplet including convection and radiation, one parameter k/d was chosen to calibrate to deal with all these issues. Calibration of k/d is given in details in the example section below. After elimination of the convection and radiation term, we can re-write the equation 3.

$$S\Delta T \int dm + L \int dm = \int_0^{\Delta t} (k/d)A(t)(T_p - T_w(t))dt \qquad (3)$$

Figure 3:
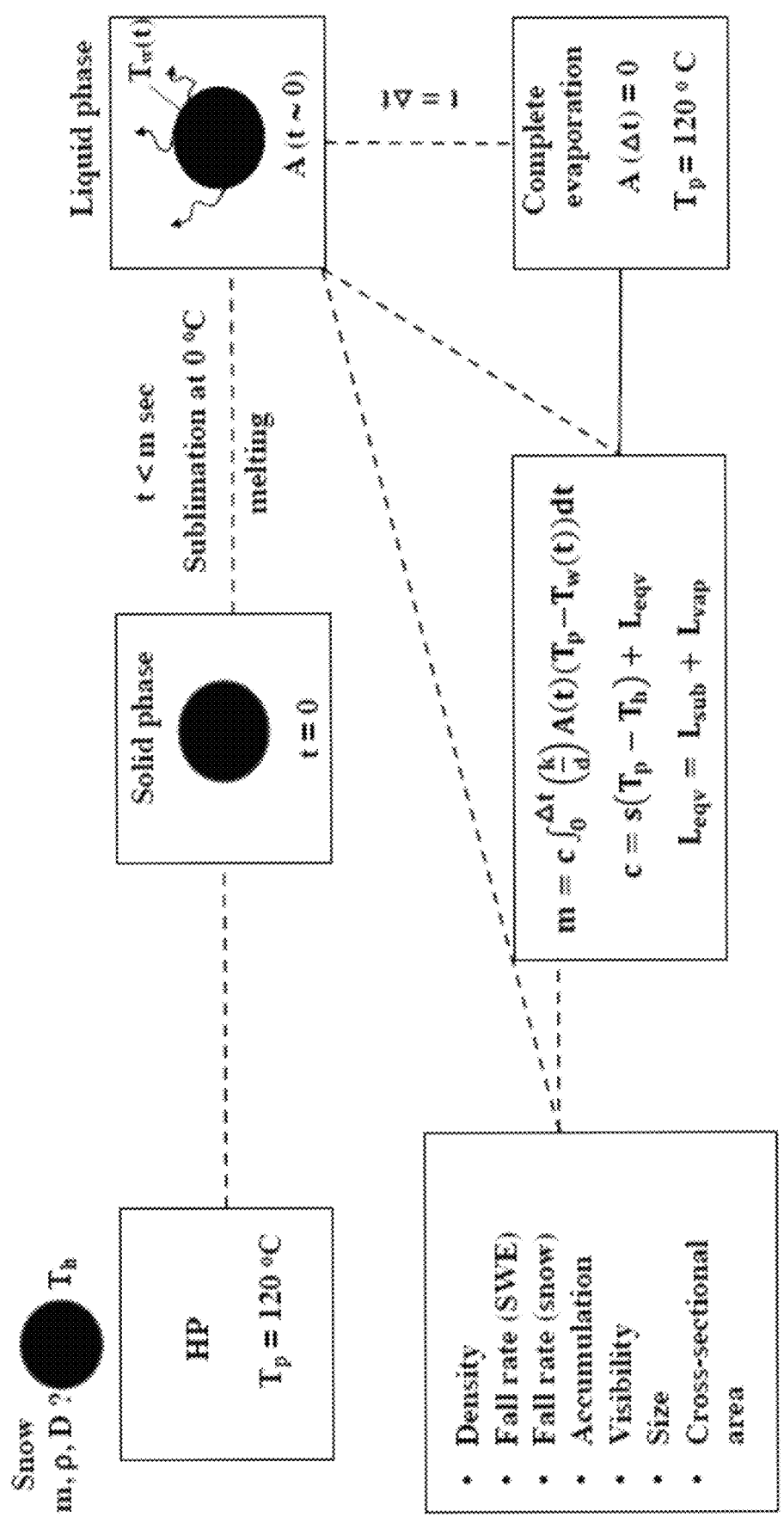
FIG. 3 is an algorithm for measuring hydrometeor mass, density, size, and cross-sectional area for a single particle where HP is the hotplate, $T_h$ is the ambient temperature, Lf is latent heat of fusion, $L_{vap}$ is latent heat of vaporization.

As can be seen, the conductive heat flux is a function of the area of the water droplet on the hotplate, evaporation time, thermal conductivity of the plate, thickness of the plate and temperature difference across the drop. The area of the water droplet can be measured with a thermal camera after falling on the hotplate taking advantage of the differential emissivity between the metal plate and the water droplet. Hydrometeors are high emissivity and appear as bright spots superimposed on a black background with a low emissivity. The cross-sectional area of the hydrometeors may be different in the air than on the hotplate after impact. Furthermore, the cross-sectional area depends on the solid and liquid state of the hydrometeors but this does not affect the calculation of mass in Eq. (2). $T_p(t)$ is the temperature of the hotplate and is maintained at a temperature below the Leidenfrost temperature so that conduction heat transfer to the hydrometeors is maximized. A schematic of one suitable algorithm used to calculate hydrometeor mass, size, area, etc. using the DEID is shown in FIG. 3.

As an example, FIG. 2 illustrates a differential emissivity imaging device 200 for measuring evaporable particle 202 properties can include a heated plate 204, a thermal camera 206, a memory device 208, and an output interface 210. The heated plate 204 can have an upper surface 212 oriented to receive falling evaporable particles 202. The evaporable particles have a particle emissivity and the upper surface has a plate surface emissivity. The thermal camera 206 can be oriented to produce a thermal image of the upper surface 212. At least one memory device can including instructions that, when executed by at least one processor, cause the imaging device to: identify individual evaporable particles from the thermal image by differences between the particle emissivity and the plate surface emissivity, determine a plate surface radiative temperature and a droplet radiative temperature as a function of a time until the droplet is evaporated, determine a surface area of the droplet, and calculate a mass of the individual evaporable particle via heat conduction using the surface area and the time. The output interface 210 can communicate the evaporable particle properties to an output device, where the evaporable particle properties include the mass.

Although not required, the upper surface can be microscopically roughened to increase the evaporation rate of the droplet. Surface roughening can also increase the interfacial surface area between the hotplate and droplet which increases the rate of heat conduction across the interface and thus the evaporation rate, while also elevating the Leidenfrost point which can allow for higher operating temperature and reduced evaporation time. Surface roughening can also improve evaporable particle capture efficiency (i.e. increase chances of hydrometeor sticking to the surface via shear force). Surface roughening can also limit liquid droplet movement during high winds or other turbulence. Roughening can be accomplished using any suitable technique such as, but not limited to, sanding, etching, and the like. In contrast, an unroughened or smooth surface can be useful in operating at lower temperatures, which requires lower power, and can improve field operating reliability.

The plate temperature can be maintained below the Leidenfrost point during evaporation of the droplet. Temperature control of the plate can be performed by a heater controller 214, which is electrically connected to the heated plate 204. The Leidenfrost point is about 180° C. (which can vary based on Zuber's equation where heat flux is minimum while a vapor blanket is formed at the droplet and upper surface interface). Typically, the heated plate surface temperature can be maintained at about 80° C. to about 110° C., and often about 100° C. The temperature of the plate can vary depending on fall intensity, air temperature and wind velocity. Accumulation of precipitation on the plate surface should also be avoided.

Differences in emissivity of the evaporable particles and the upper surface enable detection of discrete evaporable particles impacting the upper surface by an infrared camera. The plate surface emissivity can typically be much lower than the evaporable particle. Water has emissivity typically greater than 0.95, while metals typically have an emissivity of less than about 0.2 and most often less than about 0.1 (across thermal infrared wavelengths). As a general guideline, the evaporable particle emissivity is at least 0.4 higher than the plate surface emissivity; in some cases greater than 0.5, and in other cases, greater than 0.7 difference can be desirable.

The evaporable particle mass can be calculated using:

$$S\Delta T \int dm + L \int dm = \int_0^{\Delta t} (k/d)A(t)(T_p - T_w(t))dt \qquad (4)$$

where S is specific heat capacity of water (or other liquid), $\Delta T$ is a temperature difference between an initial and final temperature of the droplet, m is mass of the droplet, L is latent heat of vaporization of water (or other liquid), k is thermal conductivity of the plate, d is thickness of the plate, A(t) is plan area of the droplet as a function of time, $T_p(t)$ is the plate temperature, and $T_w(t)$ is surface temperature of the droplet as a function of time.

The imaging device 200 can optionally further comprise an optical camera 216 oriented to produce a plurality of optical images of falling evaporable particles above the heated plate. An optional laser sheet 218 can be produced by a suitable laser source 220. The laser sheet can illuminate the falling hydrometeors for the optical camera to determine vertical velocity using particle tracking velocimetry (PTV).

The physical components of the imaging device can be housed within any suitable structure, as long as obstruction of wind and hydrometeors is substantially avoided. In the example illustrated in FIG. 2, a support stem 222 and support frame 224 can be used to mount each of the components relative to one another. However, other support structures may be used.

The instructions on the memory device can determine a variety of evaporable particle properties. The following discussion describes several exemplary properties that can be calculated such as fall-velocity, precipitation rate (SWE and snow), snow density, particle size distribution, particle mass distribution, spatial correlation of particles, and visibility.

For example, fall speed can be calculated from the plurality of optical images. Differences in hydrometeor position at varied known times can be used to calculate a fall speed. Identification of falling evaporable particles can be improved by forming a laser light sheet perpendicular to an imaging axis of the optical camera in order to illuminate the evaporable particles. In one alternative, a single image can be taken with an extended exposure time so that a blurred image forms a streak in which travel distance during the exposure time can be correlated to fall speed. In such cases, some information such as hydrometeor shape and type can be compromised. However, such an approach can simplify fall speed calculations. Alternatively, or in addition, fall speed can be determined without an optical camera. For example, fall speed can be calculated without an optical camera as a function of mass and droplet area on the plate. See Bohm, J. P., 1989: *A general equation for the terminal fall speed of solid hydrometeors*, J. Atmos. Sci., 46, 2419-2427 which is incorporated herein by reference which elaborates how to relate hydrometeor mass, and circumscribed and cross-sectional area to fall speed. DEID measurements can yield fallspeed based on the equations derived therein.

Evaporable particle height can be determined prior to impact with the upper surface. Evaporable particle height can be calculated directly from optical images taken with a secondary device such as a camera pointed sideways with a field of view intersecting with a sheet of laser light aligned over the DEID. The laser and camera system can be control remotely using SLR camera software and a USB power supply to turn on and off the camera and laser. A second comparative surface area of the droplet can be determined after impact of the evaporable particle with the upper surface. The impacted surface area can be calculated using the thermal image where the difference in emissivity registers as different radiative temperatures. These differences in emissivity can be used to calculate the impacted area of the hydrometeor. Furthermore, the optical camera and thermal camera measure different dimensions. Specifically, the thermal camera takes measurements looking down (i.e. from about 45° to 90° from parallel with the plate) while the optical camera is generally oriented sideways (i.e. from 0° to less than 45° from parallel with the plate). Vertical velocity can be calculated using several methods such as particle tracking or motion blur by imaging from a side. Alternatively, vertical velocity can be calculated from the measured hydrometeor properties measured by the hotplate. Frozen evaporable particles preserve their cross-section on impact, and from that cross-section and the derived mass, it is possible to determine terminal fall speed. A distinction can be made between the terminal fall speed, that which the particles would have in still air, and the actual fall speed, that which the particles have in turbulent or moving air. Thus, there is utility for use of the device for investigations of the interactions of falling particles with turbulent fluid flows.

Evaporable particle density can then be calculated using the hydrometeor plane area, height and mass. More specifically, assuming a liquid composition, and in conjunction with the measured area on the hotplate, the product of hydrometeor height and surface area after impact with the surface can be used to estimate particle volume for non-spherical hydrometeors. The density can then be determined by dividing mass by volume. In some cases, volume can be difficult to determine precisely. However very close estimates can be readily achieved. As an example, the structure of solid hydrometeors slightly changes after impact on the hotplate. After impacts the product of plane surface area and height is a reasonable estimation of volume, and in some cases is slightly overestimated. The height of snow can be calculated based on evaporation time, which is the lifetime of snow on the hotplate. Calibration between height and evaporation time can be established using a manual measurement of density.

A precipitation flux can be calculated using the mass and the fall speed. Precipitation flux is the mass of evaporable particle per unit area of the hotplate.

Typically, the evaporable particle can be a hydrometeor, although in some cases the evaporable particle can be any volatilizable solid or liquid particle which can be evaporated through heating upon contact with the heated plate, such as those considered in industrial applications where measurement of spray characteristics is required.

A precipitation rate can be calculated using total mass loss per image frame, sampling frequency, and surface area of the heated plate. The device can measure both snow water equivalent (SWE) precipitation rate (using a density of water) and snow precipitation rate (using a density of snow). This can differentiate in the accumulation of snow. In one example, the precipitation rate is calculated as:

$$\frac{\Delta m v}{\rho A} \tag{5}$$

where $\Delta m$ is total mass loss of hydrometeors for a single thermal image, v is sampling frequency, p is density of water, and A is surface area of the heated plate.

A number density can be calculated using number of hydrometeors per unit volume, the fall speed, and time lapse. The number density is the number of snow particles per unit air volume. The volume of air can be estimated by the product of the area of the hotplate and an effective vertical distance. The effective vertical distance is a product of the average vertical velocity and the sampling time.

A visibility can be calculated using a sum of cross-sectional area of hydrometeors on the heated plate, surface area of the heated plate, and an average fall velocity of the hydrometeors calculated from the fall speed. The visibility can be calculated as 3.912/Q where $$Q = \frac{2\Sigma A}{A_p v_p t} \quad (6)$$

where A is cross sectional area of all hydrometeors on the heated plate at a sample time, $A_p$ is the area of the heated plate, $v$ is average fall speed of hydrometeors at the sample time, and t is the sample time.

A precipitation type can be identified using initial temperature drop on the heated plate. Furthermore, precipitation type can be obtained from particle shape and mass per area on the plate. Such determinations can also be augmented using optical cameras. For example, machine learning algorithms can be used to categorize particle shapes into precipitation types. Identification of type of precipitation can be performed in order to distinguish between types, e.g. rain and snow. As an example, loss of energy from the heated plate will be more for snow than a raindrop. In the case of a mixed event, when snow and rain (i.e. in a single drop, some portion was liquid and some portion was solid) falls on the heated plate, a first liquid portion reaches the hotplate temperature then a solid portion (i.e. in a thermal camera view the solid portion looks darker than liquid portion). The solid portion takes more time to reach the hotplate temperature which means more energy. Alternatively, an SLR camera and a light sheet can also visualize the type of precipitation.

The output interface can be a display or a data connection with the memory device. The memory device can be located directly on and physically connected to the heated plate. Alternatively, data can be collected in a memory storage device and then later transmitted wirelessly or through a wired connection to the memory device with instructions and a suitable processing device.

Although measurement of hydrometeors can be very useful, in some variations the device can be used to measure wind direction, speed and turbulence either without or in addition to hydrometeor characterization as outlined above. A differential emissivity imaging device for measuring wind can include a heated plate, a thermal camera, a memory device, and an output interface. Wind blowing over the heated plate creates spatial and temporal fluctuations in temperature seen by the thermal camera. Subsequent images can be used to derive wind speed, direction and turbulent variability using a technique known as Thermal Image Velocimetry (TIV). The favorable condition (high signal to noise ratio) of TIV is the high-temperature difference between the hotplate and ambient air and a low thermal admittance top surface. The same set-up with some modification (low emissivity and low thermal admittance as a top surface) can be used for the measurement of hydrometeors and wind velocity together. As a general guideline, a low emissivity can be 0.02 to 0.24.

Figure 4A:
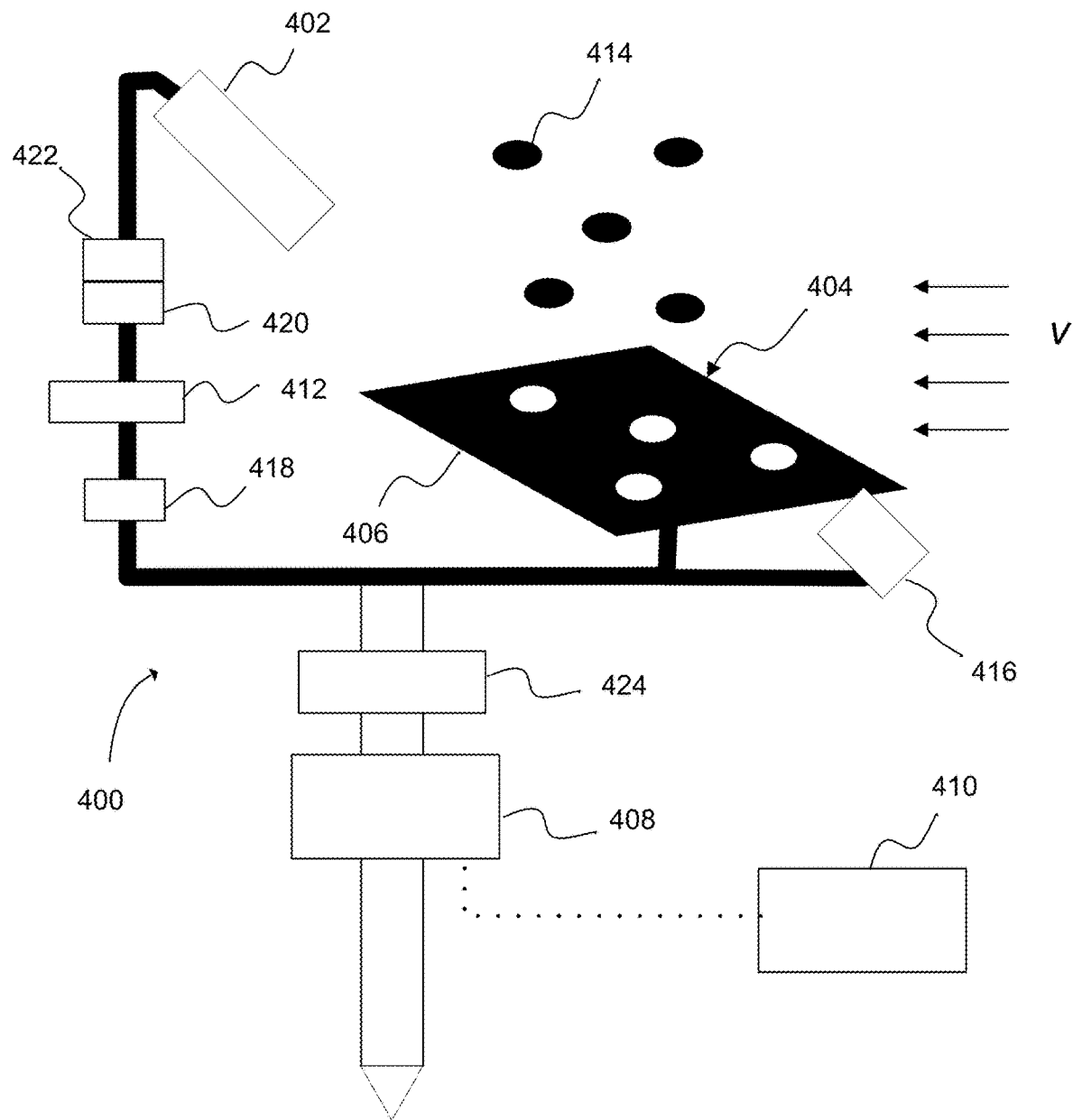
FIG. 4A is a schematic of an imaging device which can also be used to measure wind speed and direction in accordance with one example.

FIG. 4A illustrates an imaging device 400 that includes a thermal camera 402, which can be oriented to produce a thermal image of an upper surface 404 of a heated plate 406. As with the previous discussion, at least one memory device 408 can include instructions that, when executed by at least one processor 410, cause the imaging device to: identify changes in temperature of the upper surface as a function of time, determine a fluid property, and calculate a wind speed via heat convection using the plate temperature, and the surface area. For example, wind velocity can be measured by TIV, correlation of Nusselt number and Reynolds number (i.e. since these are a function of diameter and plate length), or the like. The output interface to communicate the wind speed and optionally the wind direction to an output device.

As described previously, an optional laser 412 can provide an illumination laser sheet to allow imaging of hydrometeors 414 by a corresponding optical camera 416. Additional data can be collected in order to facilitate accuracy in calculations and conditions such as, but not limited to, a pressure gauge 418 to measure pressure changes as a function of time, humidity sensor 420 to measure humidity as a function of time, and a wind speed sensor 422 to determine wind speed. In one example, a low-cost weather station (e.g. LEMS) can be used to measure wind speed, temperature and humidity. A heater controller 424 can be used to vary input to the heatplate to maintain the desired plate surface temperature in the same manner as discussed above.

This device provides a semi-direct automated measure of individual hydrometeor mass. The technology can provide accurate measurements in both laboratory and field settings.

Figure 4B:
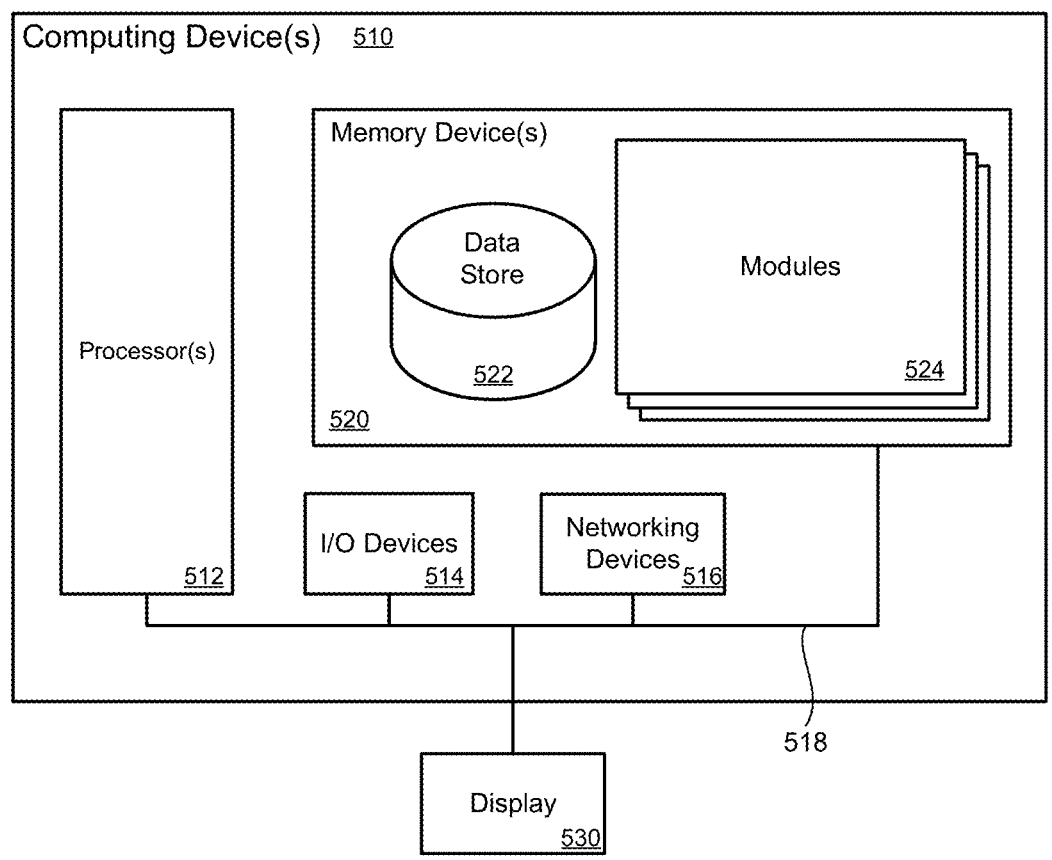
FIG. 4B is a schematic of computing devices which may be used.

FIG. 4B illustrates a computing device 510 on which modules of this technology can execute. A computing device 510 is illustrated on which a high-level example of the technology can be executed. The computing device 510 can include one or more processors 512 that are in communication with memory devices 520. The computing device 510 can include a local communication interface 518 for the components in the computing device. For example, the local communication interface 518 can be a local data bus and/or any related address or control busses as may be desired.

The memory device 520 can contain modules 524 that are executable by the processor(s) 512 and data for the modules 524. In one example, the memory device 520 can include a visual guidance module, an error calculation module, and other modules. The modules 524 may execute the functions described earlier. A data store 522 can also be located in the memory device 520 for storing data related to the modules 524 and other applications along with an operating system that is executable by the processor(s) 512.

Other applications can also be stored in the memory device 520 and may be executable by the processor(s) 512. Components or modules discussed in this description that can be implemented in the form of software using high-level programming languages that are compiled, interpreted or executed using a hybrid of the methods.

The computing device 510 can also have access to I/O (input/output) devices 514 that are usable by the computing device 510. Output generated by the computing device 510 can be provided to a display 530 and other output devices. Networking devices 516 and similar communication devices may be included in the computing device 510. The networking devices 516 can be wired or wireless networking devices that connect to the internet, a LAN, WAN, or other computing network.

The components or modules that are shown as being stored in the memory device 520 can be executed by the processor(s) 512. The term "executable" may mean a program file that is in a form that may be executed by a processor 512. For example, a program in a higher level language may be compiled into machine code in a format that may be loaded into a random access portion of the memory device 520 and executed by the processor 512, or source code can be loaded by another executable program and interpreted to generate instructions in a random access portion of the memory to be executed by a processor. The executable program can be stored in any portion or component of the memory device 520. For example, the memory device 520 may be random access memory (RAM), read only memory (ROM), flash memory, a solid state drive, memory card, a hard drive, optical disk, floppy disk, magnetic tape, or any other memory components.

The processor 512 may represent multiple processors and the memory device 520 may represent multiple memory units that operate in parallel to the processing circuits. This can provide parallel processing channels for the processes and data in the system. The local communication interface 518 can be used as a network to facilitate communication between any of the multiple processors and multiple memories. The local communication interface 518 can use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules can also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but are not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein can also contain communication connections or networking apparatus, and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

References made to the examples illustrated in the drawings and specific language were used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Example

The experimental set-up includes a thermal camera, a hotplate with a low emissivity top surface, green laser 3 mm thick sheet 520 nm wavelength, low-cost energy-budget measurement station (LEMS), pressure gauge and IV system for fixed volume water droplet apply on the hotplate and shown in FIG. 4A. This experimental set-up was designed to measure the mass of water droplets and snow particles (ice made in the laboratory) in different environmental conditions including wind, humidity, roughness of the hotplate, and temperature of the hotplate. Wind tunnel section was made air tight and air temperature was considered as ambient temperature. The mass of the water droplets was measured by varying the one parameter and keeping the rest of the parameters, including wind velocity, roughness of the hotplate, temperature of the hotplate, and humidity, constant. Wind velocity range was set from 0 to 12 m s$^{-1}$ and the hotplate temperature range was set from 80 to 115° C.

Images of the hotplate were captured with a thermal camera (infratec VarioCAM HD) with maximum fps 60 and the minimum 2 fps, depending on the intensity of fall of the hydrometeors.

The focus of the thermal camera was set manually using a calibration sheet made of different emissivity values and placed on the hotplate at a constant temperature. The temporal variation in hotplate temperature is 1° C. The thermal camera software (ref) saved image default in. IRG format, then images were converted into black/white .tiff format by setting the upper (temperature of the hotplate) and lower temperature (background temperature). For temperature information of each pixel, the .IRB file was converted into .Mat file. The temperature of the hotplate was measured with a thermal camera, as well as K-type thermocouple with an error of ±1° C. After the hydrometeors fall on the hotplate, the thermal camera measures the infrared temperature of the top of hydrometeors and infrared temperature of the hotplate (an adjacent unoccupied space of the hotplate) is measured with a k-type thermocouple. For the measurement of a cross-sectional area of hydrometeors on the hotplate, RGB images were converted into grayscale and then converted into binary using a threshold. The threshold value for binary conversion was selected based on the mean of a range of threshold for the approximately constant cross-sectional area.

To validate the mass measurement of a water droplet, the mass measured using the device was compared with pipette-inferred drop mass and droplet mass measured using a scale. Sixteen different droplet volumes of water were applied to the hotplate. Specifically, droplet volumes of 5, 10, 15, 20, 25, 30, 35, 40, 50, 60, 70, 80, 90, 100, 110, 120 μL were placed on the hotplate using a pipette and gravimetrically weighed using a digital scale. The mean of three trials was considered for each droplet's water volume. The DEID mass measurement is a function of the temperature difference between the hotplate and ambient air temperature, the thermal conductivity, thickness, and roughness of the plate, ambient wind speed, and humidity. However, all of these parameters are not independent and integration of these parameters over time is essentially constant. The temperature of the hotplate was set to 100° C., had a known roughness, was exposed to near zero wind speed (the experiment was performed in closed room) and almost constant air humidity levels for all trials. Due to uncertainty in the thermal conductivity and thickness of the hotplate as well as some loss of energy from the water droplet in form of radiation and convection, k/d was calibrated for water droplet and snow (snow/ice crystals were made in the laboratory with constant density). For k/d calibration, all variables were set constant including roughness of the hotplate, temperature of the hotplate, ambient wind speed and relative humidity. Next, 0.02 grams of known water droplet mass was applied on the hotplate 10 times (FIG. 5A), and using the energy (Eq. (2)), the thermal mass of the water droplet was measured in terms of k/d. k/d was then obtained using the mean value from 10 trials, and a similar procedure was used for snow. Hence, for a different hotplate, the k/d calibration with known mass would need to be repeated. The major difference for calibration of k/d for waterdrop and snow at 0° C. is excess heat loss from the hotplate for snow, which is mLf, where Lf is latent heat of fusion.

Figure 6:
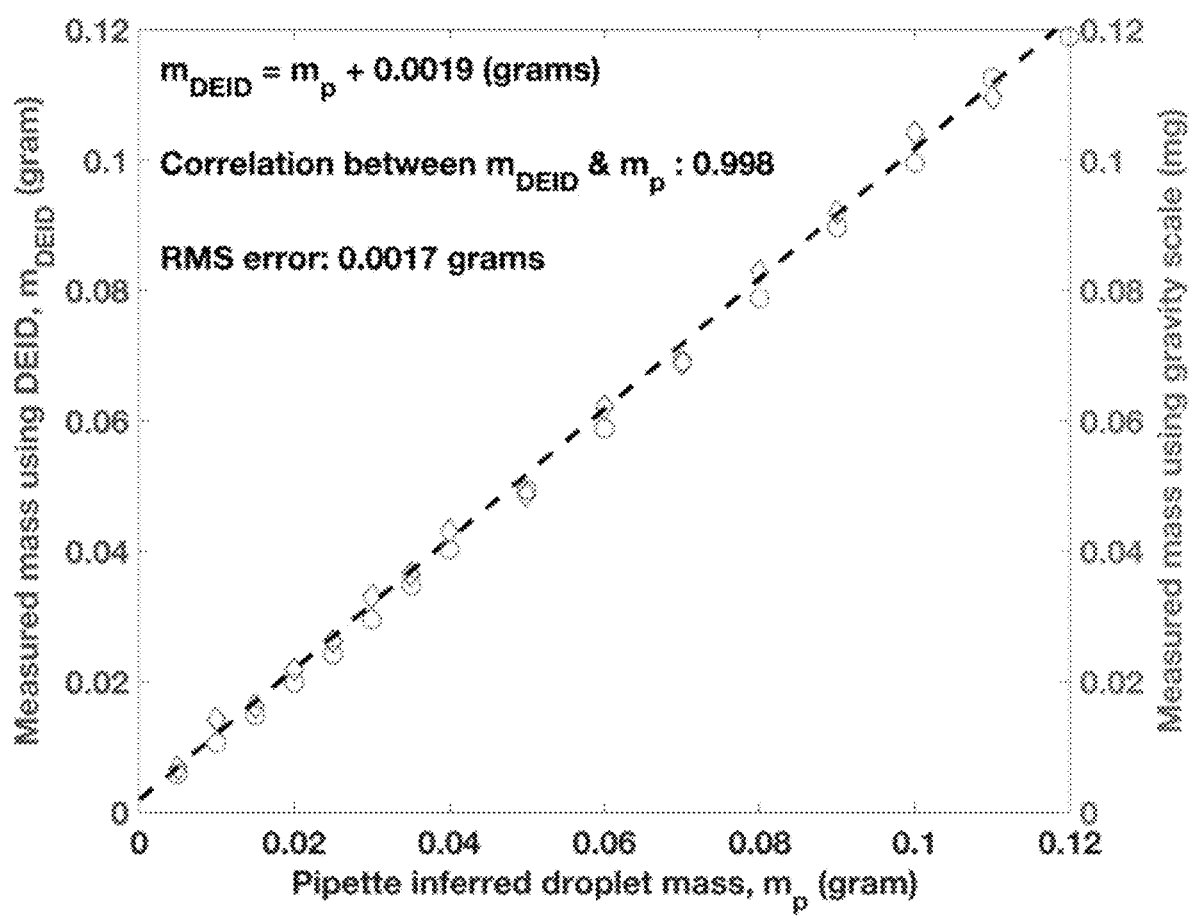
FIG. 6 is a correlation between water droplet mass measured from a pipette and invention method shown with a linear fit (coefficient of determination is 0.998). Mass of water droplet also measured using a weighing scale after apply water droplet on it through pipette in a similar way.
Figure 7:
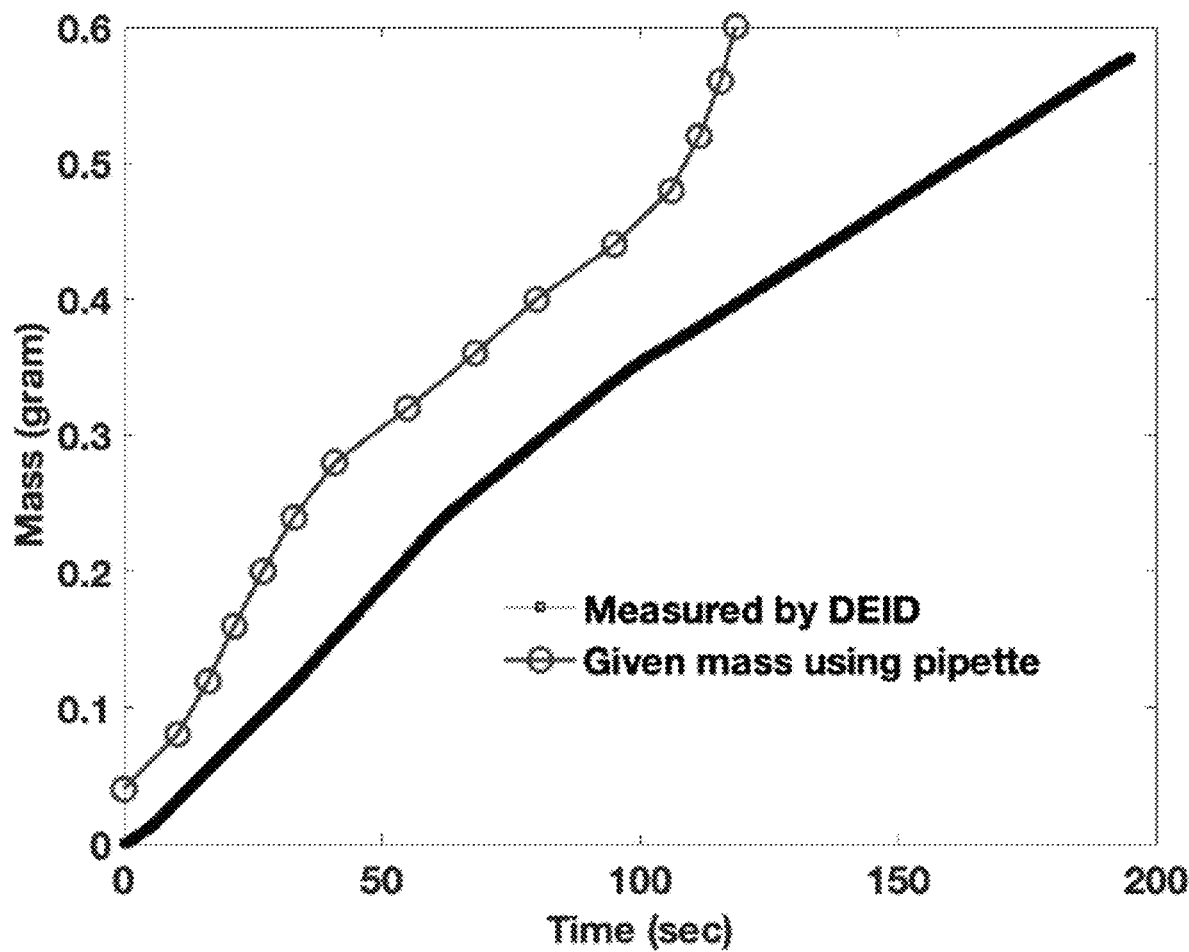
FIG. 7 shows an accumulation of mass droplet on the hotplate. Water droplets (each mass 0.04 g) were applied on the hotplate using pipette and measured mass by this method.

After setting k/d in Eq. (2), mass was measured for the 16 different known droplet volumes using the DEID. Pipette-inferred mass and mass obtained with the weighing scale are plotted in FIG. 6. FIG. 6 shows that the correlation between the thermally-determined droplet mass and pipette-inferred droplet mass is 0.976 with a root mean square error of 0.002 grams. To validate the mass accumulation on the hotplate, 15 water droplets each with a mass 0.02 g were applied on the hotplate and mass measured using the DEID method. There is a time lag between water droplet application and complete evaporation from the hotplate. Pipette mass was measured at the time of application and DEID measured mass between arrival of the water droplet to complete evaporation, and mass accumulation measured from two methods is plotted in FIG. 7 with 0.023 g error in mass.

Figure 8:
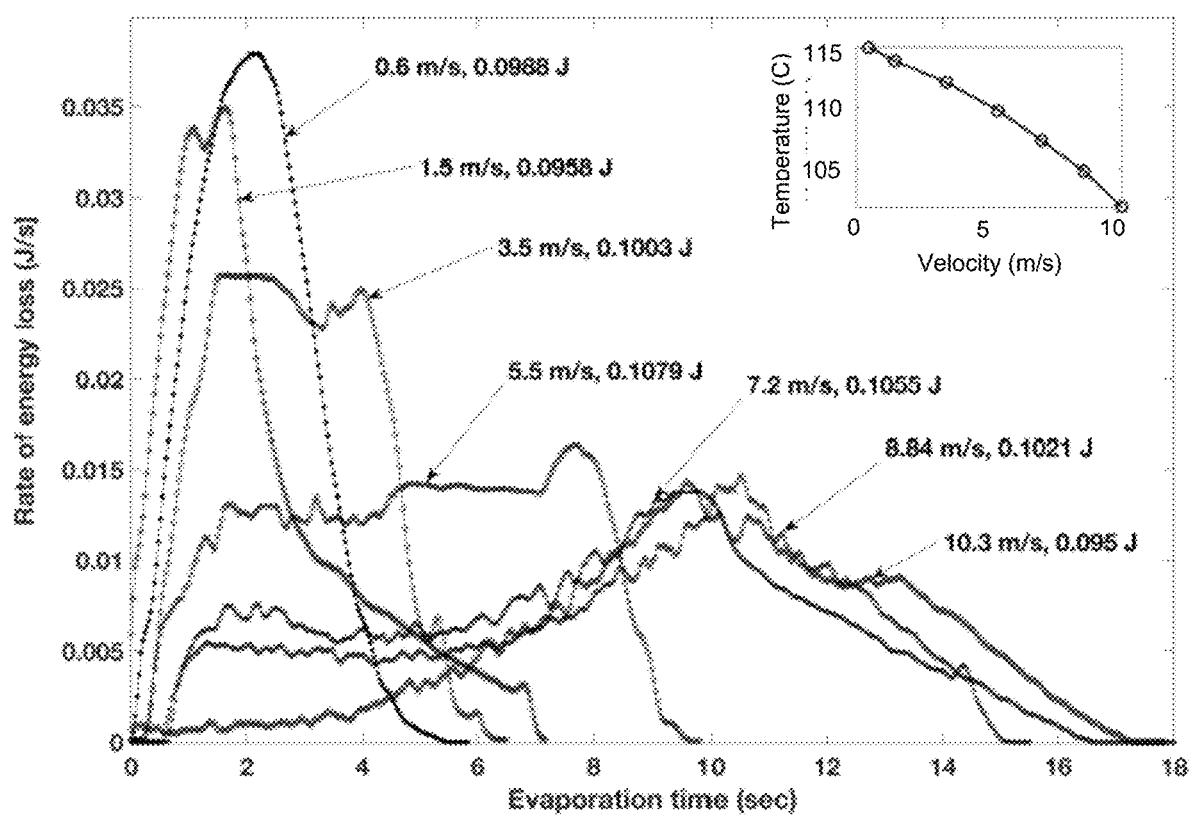
FIG. 8 is a graph of rate of loss of energy from the hotplate for given mass 0.04 g at different velocities.

To see the effect of wind velocity for mass measurement using the DEID method, all parameters except velocity were fixed and velocity was changed from 0.5 ms$^{-1}$ to 12 ms$^{-1}$. Experiments were performed after reaching a steady state of velocity. These experiments were repeated five times and the average of instantaneous energy loss per second from the hotplate is plotted in FIG. 8. Total energy loss for a given mass (0.04 g) is approximately constant with a standard deviation of 0.013 Joule, and a standard deviation in mass measurement is 0.004 g. All variables including humidity, temperature of the hotplate, and roughness of the plate were fixed initially, but humidity and temperature of the plate changed due to change in wind velocity. Temperature of the hotplate changed by about 18° C. and humidity changed by 2% for wind velocity 0.5 ms$^{-1}$ to 12 ms$^{-1}$. Air temperature of the wind tunnel was constant. Temperature of the plate with respect to velocity is plotted in FIG. 8. The used hotplate is custom made and has a feedback mechanism, but when rate of loss of energy is more than input power, the temperature of the hotplate changes.

Figure 9:
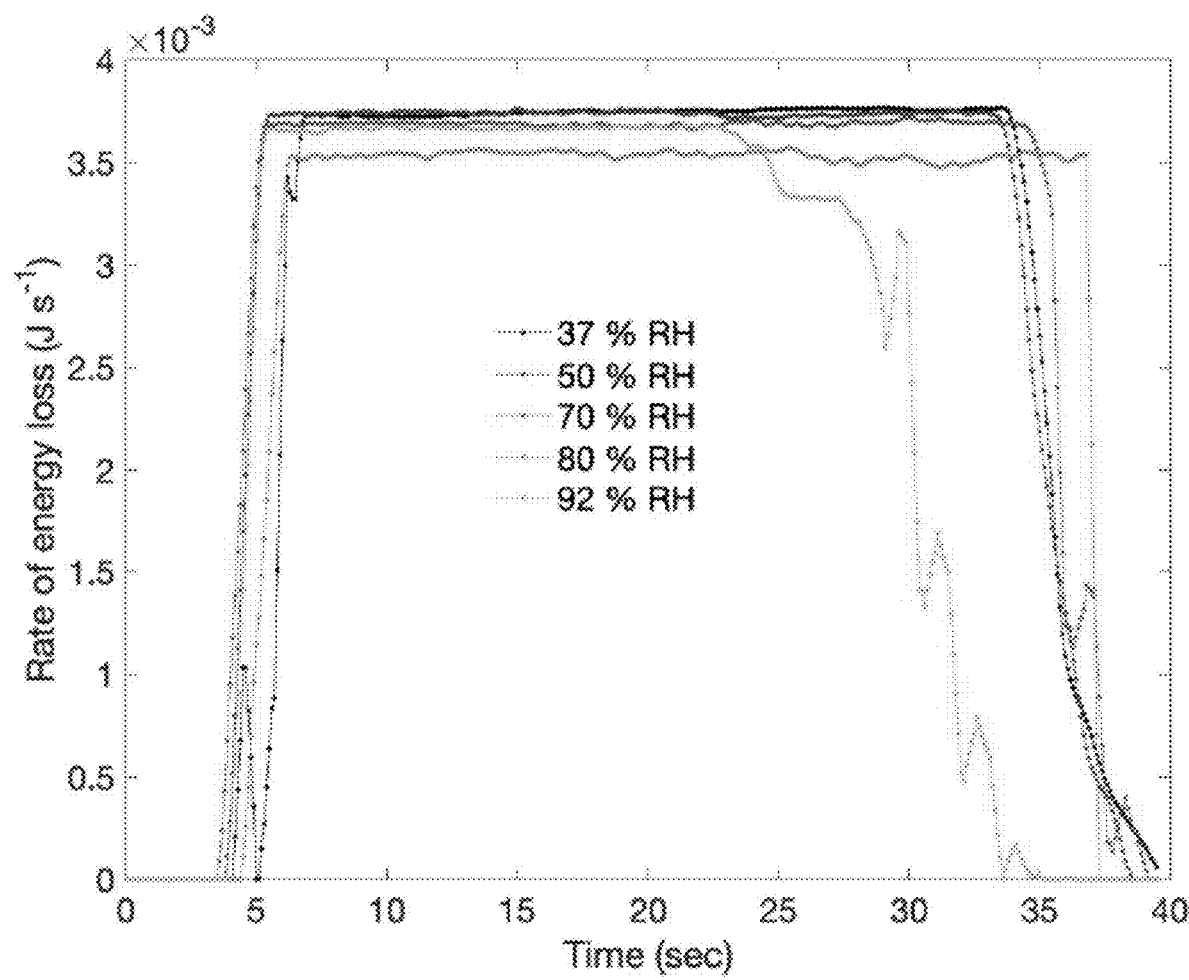
FIG. 9 is a graph of rate of loss of energy from the hotplate for given mass 0.04 g at different ambient relative humidity.

To see the effect of humidity for mass measurement using the DEID method, the humidity was varied from ambient relative humidity (37% to 92%), the velocity was set as approximately zero (0.02 ms$^{-1}$), and the temperature of the plate was set at 100° C. and with a roughed top low emissivity surface. Humidity was changed using two humidifiers and four humidity sensors at different locations (4 cm, 11 cm, 16 cm and 20 cm) deployed in a closed section of the wind tunnel to measure the homogeneous distribution of relative humidity. A first experiment was performed at ambient relative humidity (37 RH %), then more humidity was introduced from the humidifier and mixed using a small fan inside the wind tunnel for 5 minutes. Subsequently, a constant humidity was maintained and the same procedure was maintained for the rest of the experiments. Heat loss from the hotplate was almost the same for all cases at 0.1±0.015 Joule, as plotted in FIG. 9.

Figure 10:
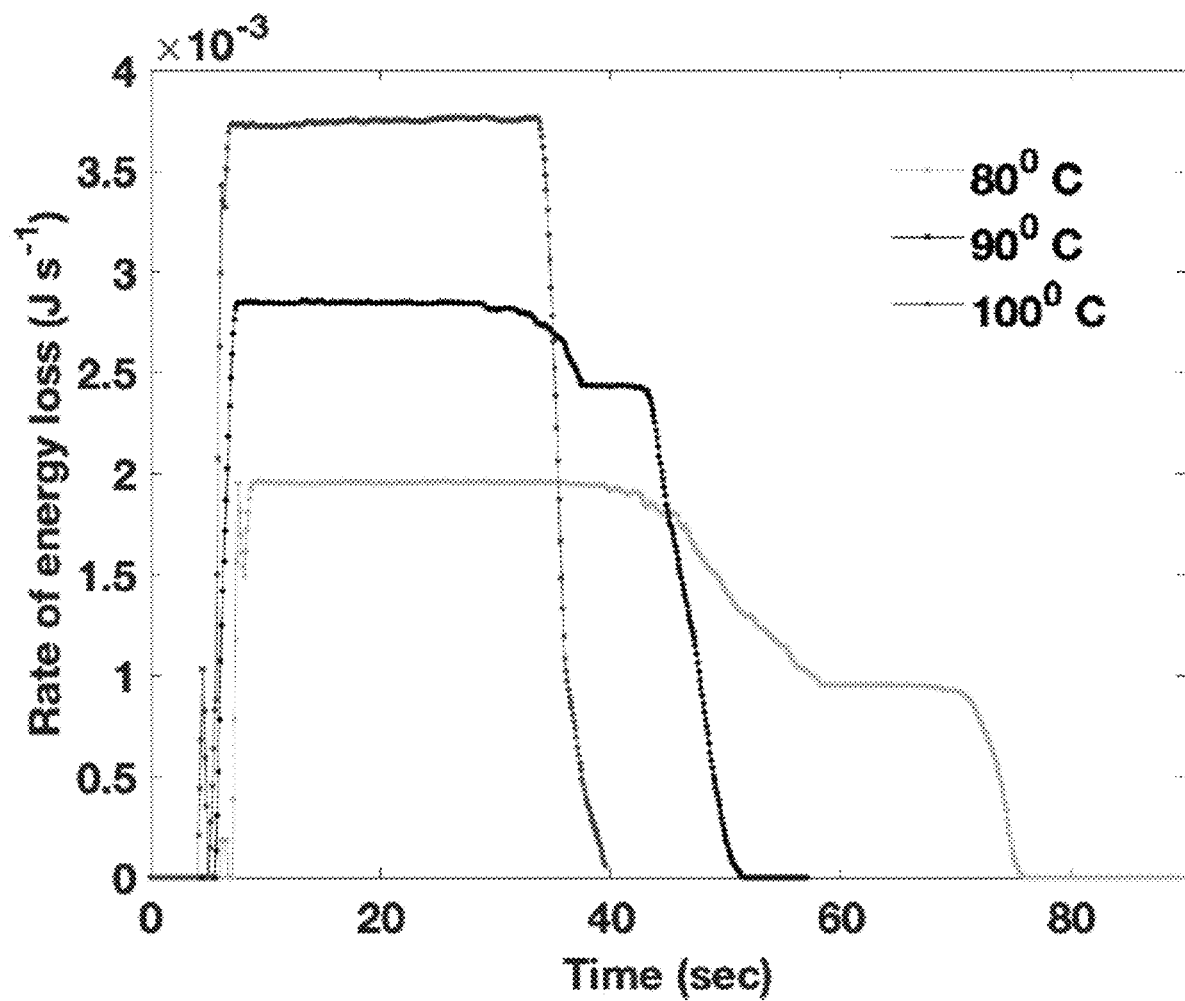
FIG. 10 is a graph of rate of loss of energy from the hotplate for given mass 0.04 g at different temperatures of the hotplate.

To see the effect of temperature of the hotplate for mass measurement using the DEID method, the temperature of the hotplate was varied from 80° C. to 115° C., the velocity was set as approximately zero (0.02 m s$^{-1}$), and the relative humidity was 37% for all the cases. Evaporation time was different for different temperatures, but heat loss from the hotplate was almost the same for all cases at 0.1±0.015 Joules as plotted in FIG. 10. This shows that the system is consistent under varied environmental conditions.

The following instruments were deployed at the observation site to measure the physical properties of snow and rain. (1) DEID: the hotplate, thermal camera (infratec VarioCAM HD), light sheet (LED) and SLR camera (Nikon D810), (2)

low-cost energy-budget measurement station (LEMS) to measure wind speed, temperature and relative humidity. A code was written in MATLAB to extract the physical properties of hydrometeors including diameter, cross-sectional area, evaporation time, fall rate, density, and visibility. For size measuring, assumptions were made as follows: $A(t=0)=(\pi/4)d^2_{eff}$ where $A(t=0)$ is the cross-sectional area of a hydrometeor just after impact on the hotplate, and defy is the equivalent circular diameter at the point of contact (FIG. 5). The evaporation time is a time interval between a droplet landing on the hotplate and disappearing from the hotplate (cross-sectional area=0). For calculation of snow water equivalent (SWE) precipitation rate, mass conservation of hydrometeors is assumed (i.e., the mass of hydrometeors falling on the hotplate is the same as the mass that evaporates from the hotplate).

A code was written in MATLAB to extract the physical properties of hydrometeors including diameter, cross-sectional area, evaporation time, fall rate, density, and visibility. For size measuring, $A(t=0)=(\pi/4)d^2_{eff}$ was used, where $A(t=0)$ is the cross-sectional area of a hydrometeor just after impact on the hotplate, and dell is equivalent circular diameter at the point of contact. Evaporation time is the time interval between arriving on the hotplate and disappearing from the hotplate (cross-sectional area=0). For calculation of SWE precipitation rate, mass conservation of hydrometeors is assumed, which is a mass of hydrometeors fall on the hotplate is same as mass evaporate from the hotplate.

$$Precipitation rate(SWE) = \frac{\Delta mv}{\rho A} \quad (7)$$

where, $\Delta m$ is total mass loss of hydrometeors in each frame, v is sampling frequency, p is density of water, and A is area of the hotplate. For calculation of density of an individual snowflake, mass and volume (assuming spherical particle: $(\pi/6)d^3_{eff}$) of each are measured using the hotplate and thermal camera. The diameter of the snowflakes was measured just after the impact on the hotplate, and the mass was measured after complete evaporation from a hotplate. In each frame, snowflakes that incident on the hotplate evaporated. The density of snowflakes was estimated using the mass and volume shown in FIG. 5 and the relation between mass and size is shown in FIG. 6. Snow precipitation rate calculation:

$$SnowPrecipitation rate = \frac{\Delta mv}{\rho_s A} \quad (8)$$

where, $\rho_s$ is the density of snow.

Visibility was computed using the Koschmieder relation: $Vis=3.912/Q$ where, Q is the total scattering cross-sectional area of hydrometeors per unit volume (taken as twice the physical cross-sectional area of hydrometeors following Rasmussen et al. 1998). The hydrometeor cross-sectional area was measured directly using the hotplate and thermal camera.

$$Q = \frac{2\Sigma A}{A_p v_p t} \quad (9)$$

where $\Sigma A$ is a sum of the cross sectional area of all hydrometeors fall on the hotplate in sample time, $A_p$ is the area of the hotplate, $V_p$ is the average fall velocity of hydrometeors in the sample time and t is the sample time.

Figure 16A:
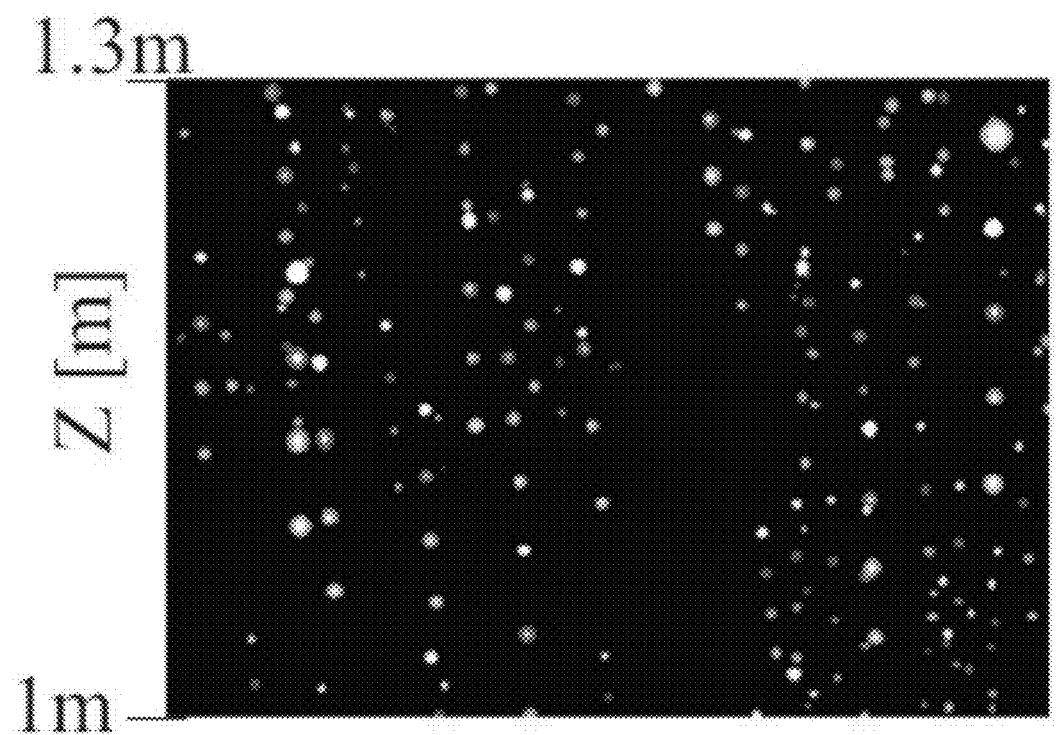
FIG. 16A-16D show tracking of snow particles.
Figure 16B:
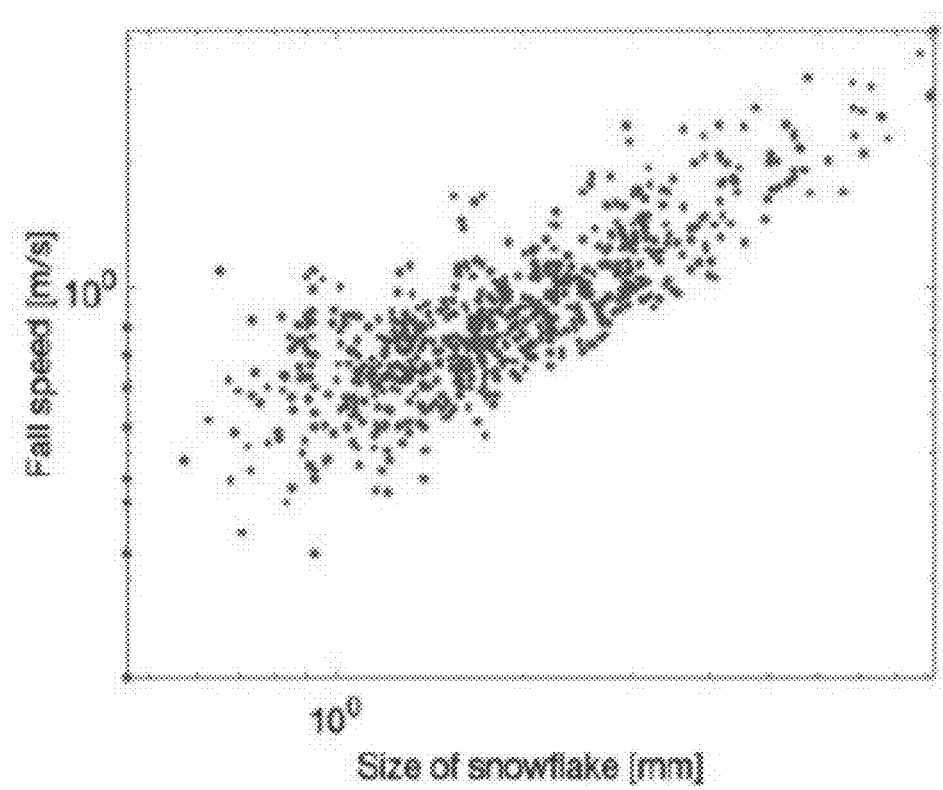

To measure hydrometeor fall speed, a thick light sheet and SLR camera was deployed over the hotplate. The depth of field of the camera was set to be more than the thickness of the light sheet to avoid out-of-focus images. The camera recorded continuously at 60 fps and the exposure time was set to a small value (50 µs) to minimize displacement of snow particles within a frame. The camera (773×1103 pixel; 0.4 mm 400 pixel$^{-1}$) was located perpendicular to and 0.5 m away from the light sheet. During experiments, video and measured weather variables (wind speed, air temperature and relative humidity) were continuously recorded. Captured images of snow particles were converted to binary form using a threshold value and the particle physical properties (centroid position, major and minor axis) measured using the regionprops MATLAB command. Snowflake fall speeds were measured by tracking using Image J and MATLAB. Fall speed, size distribution, wind speed, and air temperature are shown in FIGS. 16A-B. Major and minor snow particle's axes were not the same because of particle displacement along the particle's trajectory. The snow particle's minor axis (perpendicular to the direction of snowfall) was used to compute size distributions.

Size, shape, and distributions of hydrometeors can have a high impact on numerical weather model predictions. Estimated size distribution of rain drops and size distribution follows the exponential form with a constant intercept at D=0 (where D is diameter) for all types of fall rates. Accurate measurement of size and shape of hydrometeors is challenging because of high winds, the effect of turbulence, and the unknown density of snow particles. Size distributions of hydrometeors was measured using DEID, including the light sheet and SLR camera. For snow, an effective circular diameter was measured just after impact on the hotplate and three cases were considered to evaluate the size distribution. During all three days, the type of precipitation was almost spherical. In the case of a raindrop, the size of a drop changes significantly after impact. For raindrop size, first mass is measured using the DEID and this mass is converted into size of the raindrop using density of water and spherical shape assumption. For calculation of the size distribution per unit air volume, an effective volume of air was estimated from the product of the area of the hotplate and an effective vertical distance where the effective vertical distance is a product of the average vertical velocity and the sampling time. The vertical velocity of the hydrometeors is measured using a laser sheet and an SLR camera. Three days of rain and three days of snow were used for the analysis. An exponential size of distribution was used for effective diameters greater than 0.5 mm using bin sizes of 0.1 and 0.2 mm.

Figure 11A:
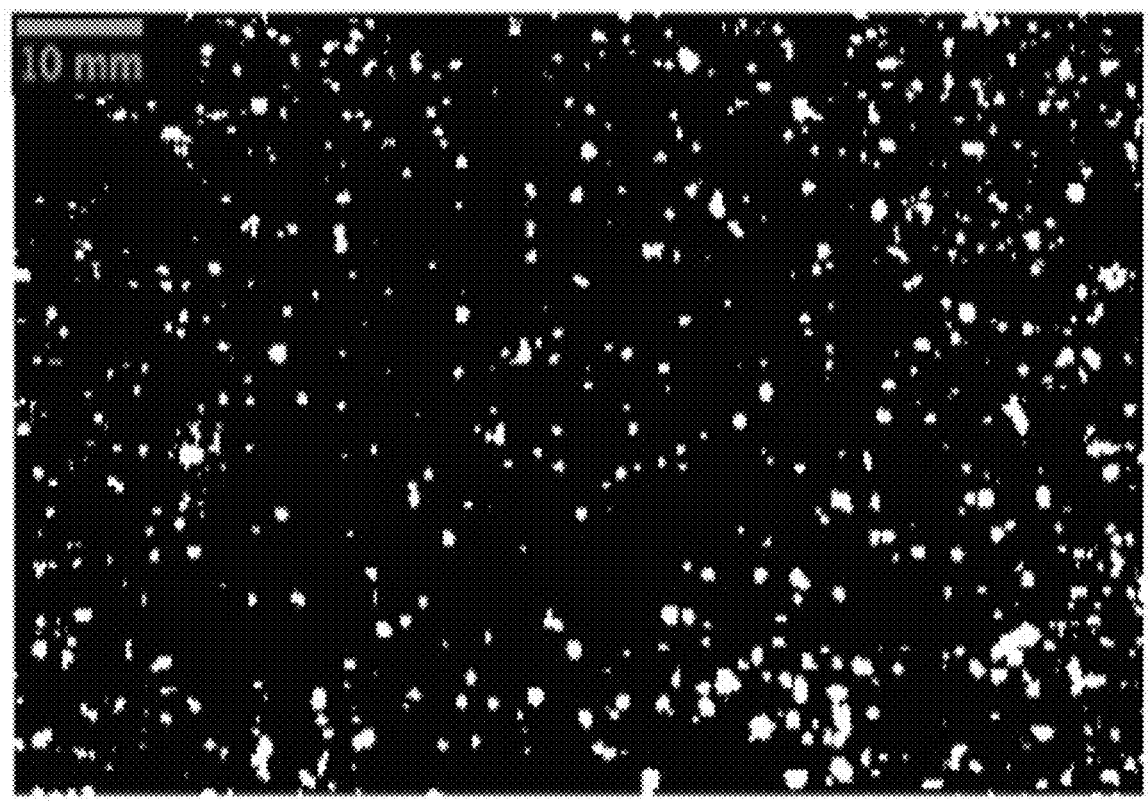
FIG. 11A is an image of snow particles assembled on the hotplate in some time (horizontal plane) as captured using thermal camera. Size and cross-sectional area is correct for some of the snow particles, which arrived in this frame and rest are not correct physical properties due to evaporation.
Figure 11B:
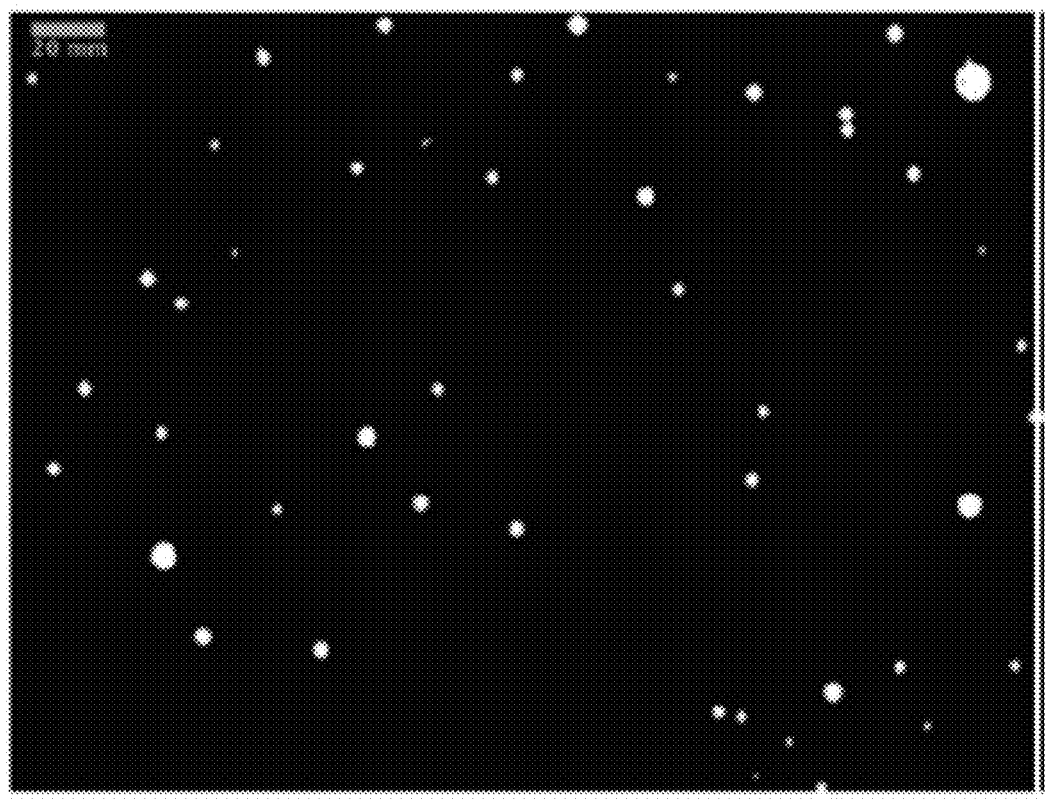
FIG. 11B is an image of snow particles in air (vertical plane) as captured using SLR camera.

Based on these experiments, the following presents specific data recorded. FIG. 11A is an image of snow particles assembled on the hotplate in a set time (horizontal plane) as captured using the thermal camera. Size and cross-sectional area is correct for some of the snow particles which arrived in this frame, and the rest are not correct physical properties due to evaporation. FIG. 11B is an image of snow particles in air (vertical plane) as captured using the SLR camera.

Figure 12A:
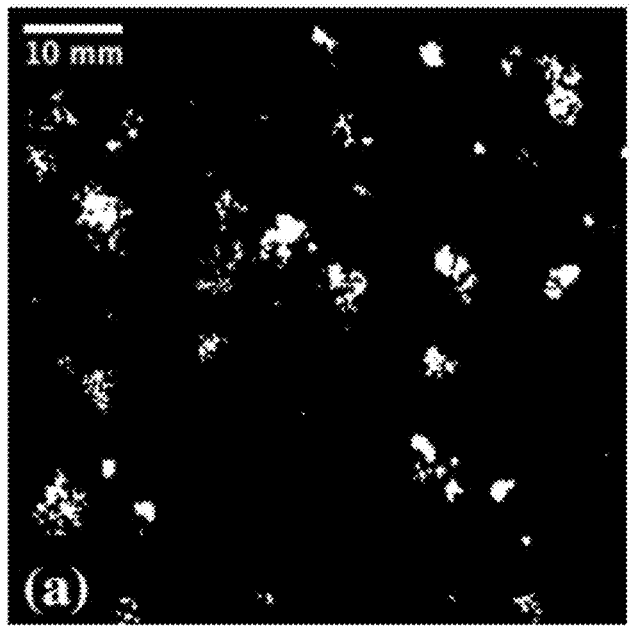
FIG. 12A-D are images of the snow particles on the hotplate is captured using a thermal camera and density is measured by mass and effective spherical volume (winter 2019).
Figure 12B:
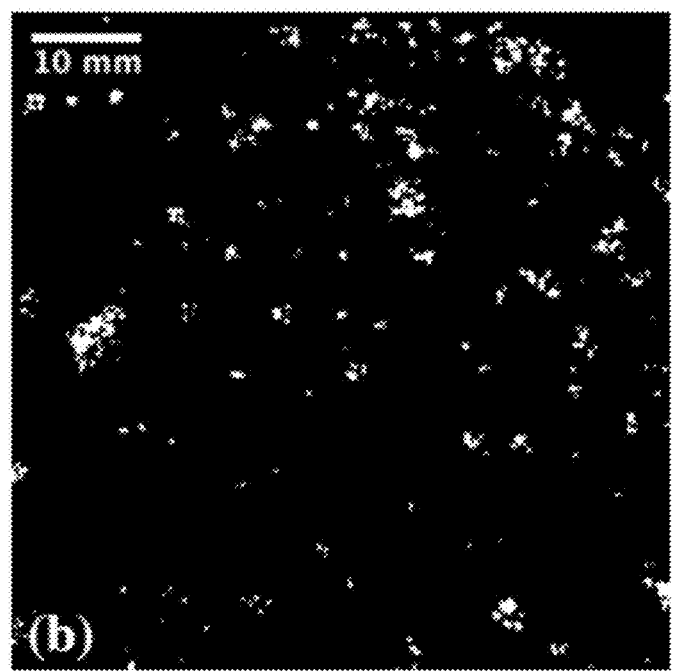
Figure 12C:
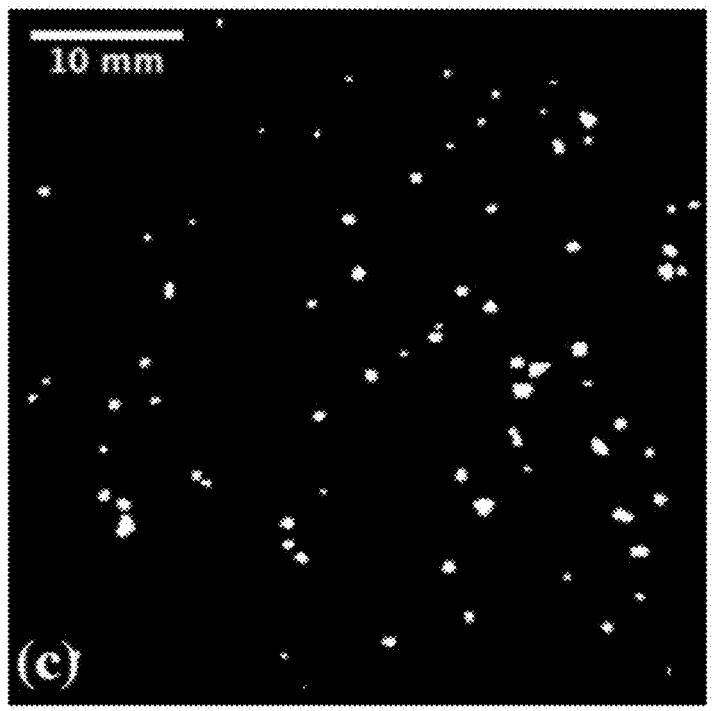
Figure 12D:
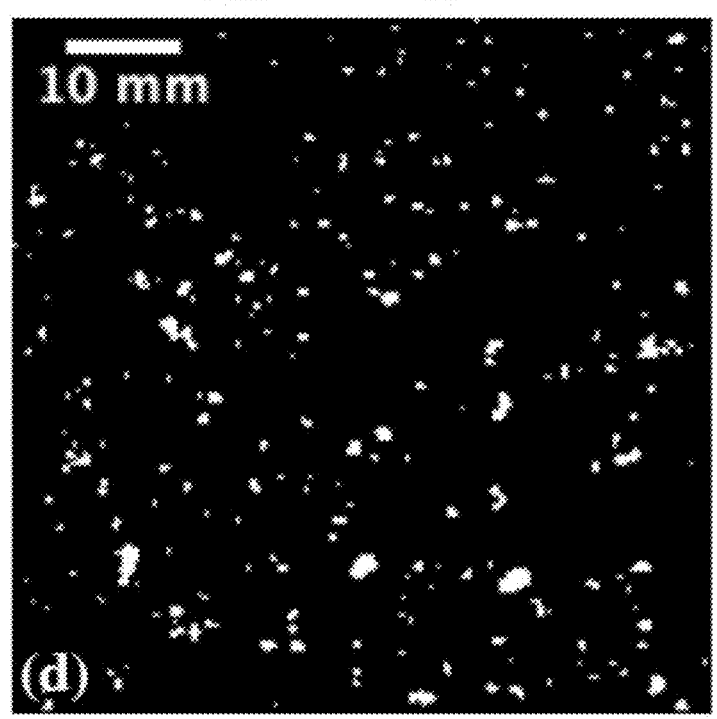

FIGS. 12A-D are images of the snow particles on the hotplate as captured using a thermal camera and density was measured by mass and effective spherical volume (winter 2019). FIG. 12A shows mean density of snow particles, SWE fall rate, snowfall rate, and a fraction of area of snow occupied on the hotplate, which are 95 kg/m$^3$, 2.5 mm/hr, 26.3 mm/hr and 0.03, respectively. FIG. 12B shows mean density of snow particles, SWE fall rate, snowfall rate, and a fraction of area of snow occupied on the hotplate as 82 kg/m³, 1.4 mm/hr, 17.06 mm/hr and 0.02, respectively. FIG. 12C shows the mean density of snow particles, SWE fall rate, snowfall rate, and a fraction of area of snow occupied on the hotplate as 260 kg/m³, 1.5 mm/hr, 5.76 mm/hr and 0.014, respectively. FIG. 12D shows the mean density of snow particles, SWE fall rate, snowfall rate, and a fraction of area of snow occupied on the hotplate as 42 kg/m³, 6.28 mm/hr, 149.52 mm/hr and 0.03, respectively.

Figure 13:
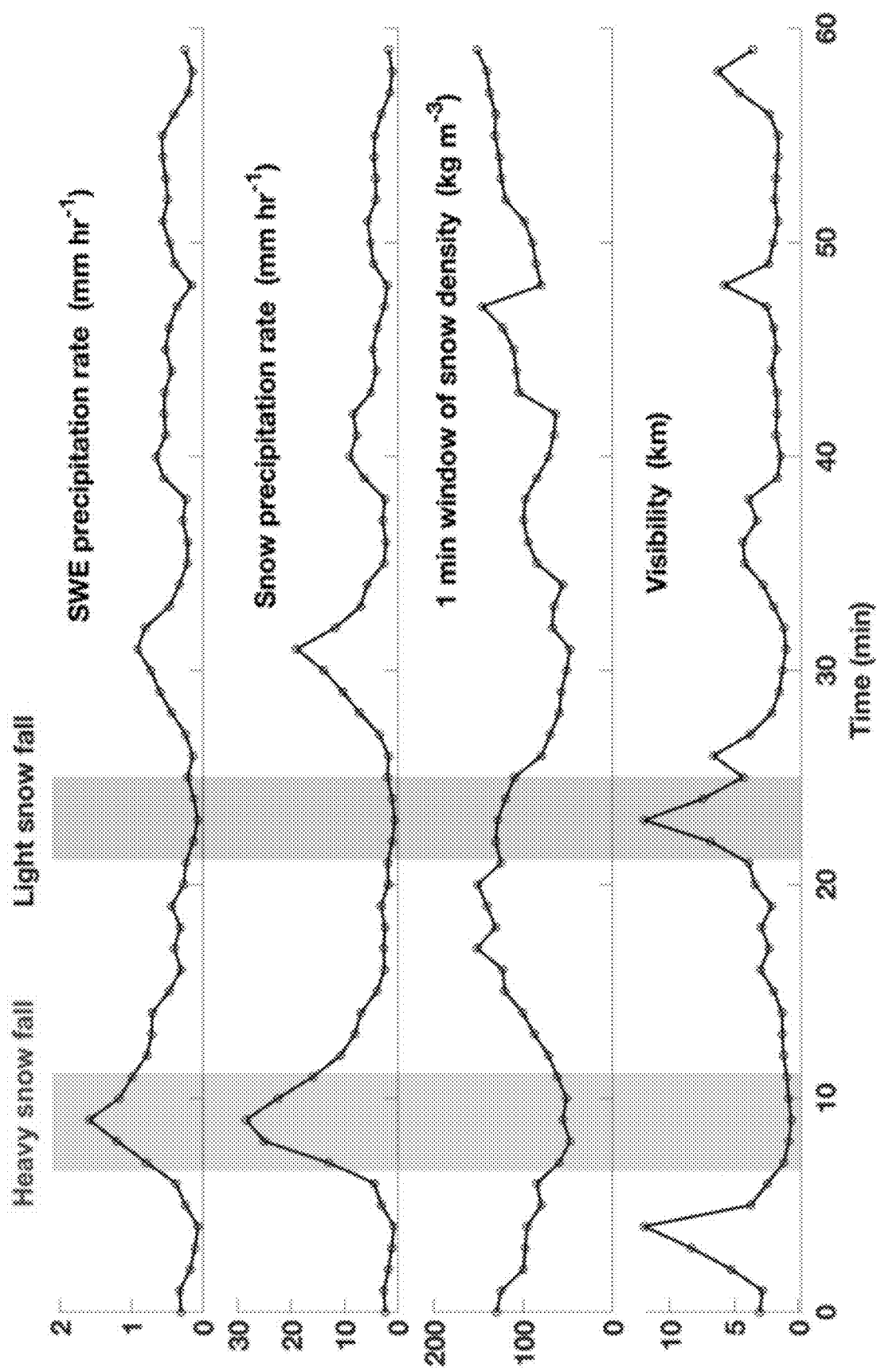
FIG. 13 is a graph of the melted snow precipitation rate (SWE), snow precipitation rate, mean density of snow and visibility with time.

FIG. 13 is a graph of the melted snow precipitation rate (SWE), snow precipitation rate, mean density of snow and visibility with time.

Figure 14:
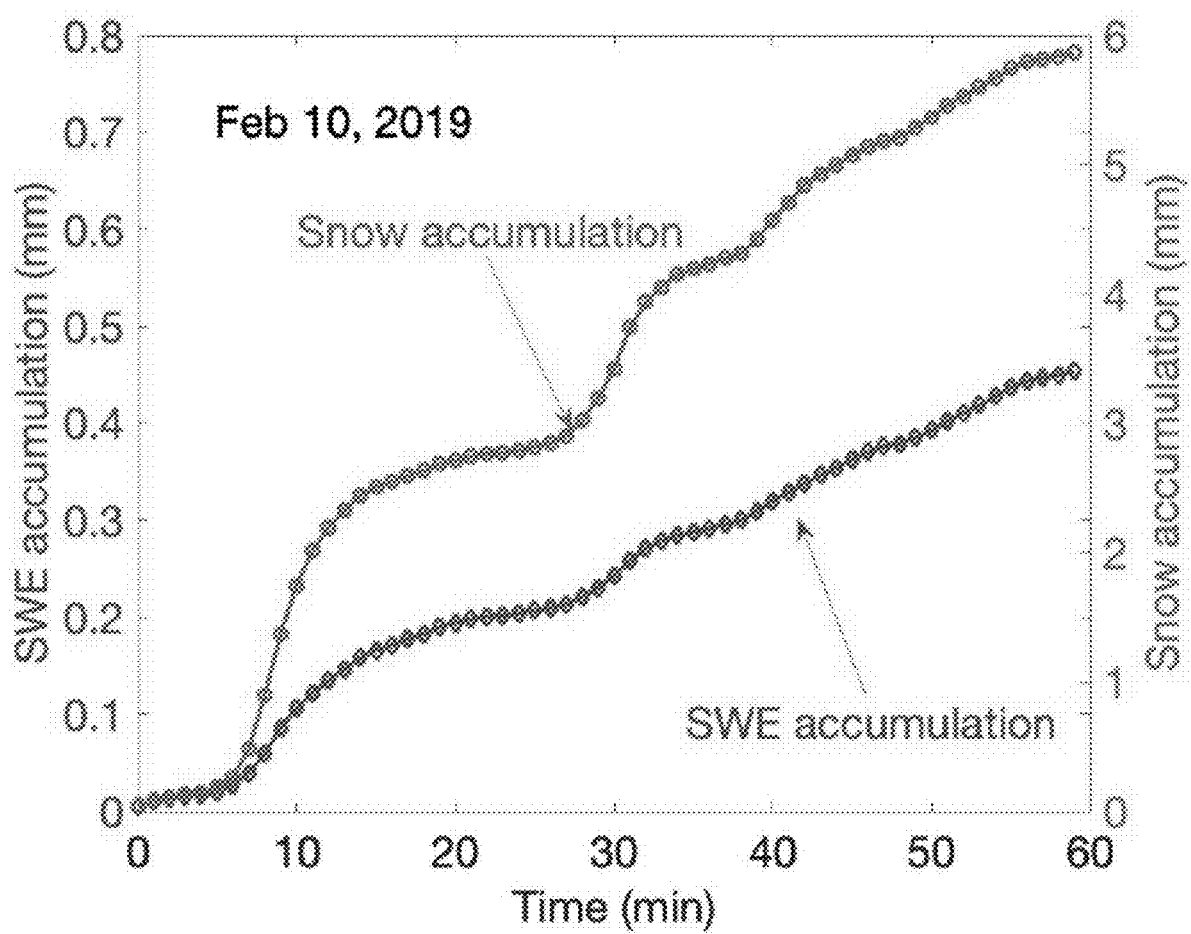
FIG. 14 is a graph of SWE and snow accumulation is derived from heat loss from the hotplate.

FIG. 14 is a graph of SWE and snow accumulation is derived from heat loss from the hotplate.

Figure 15:
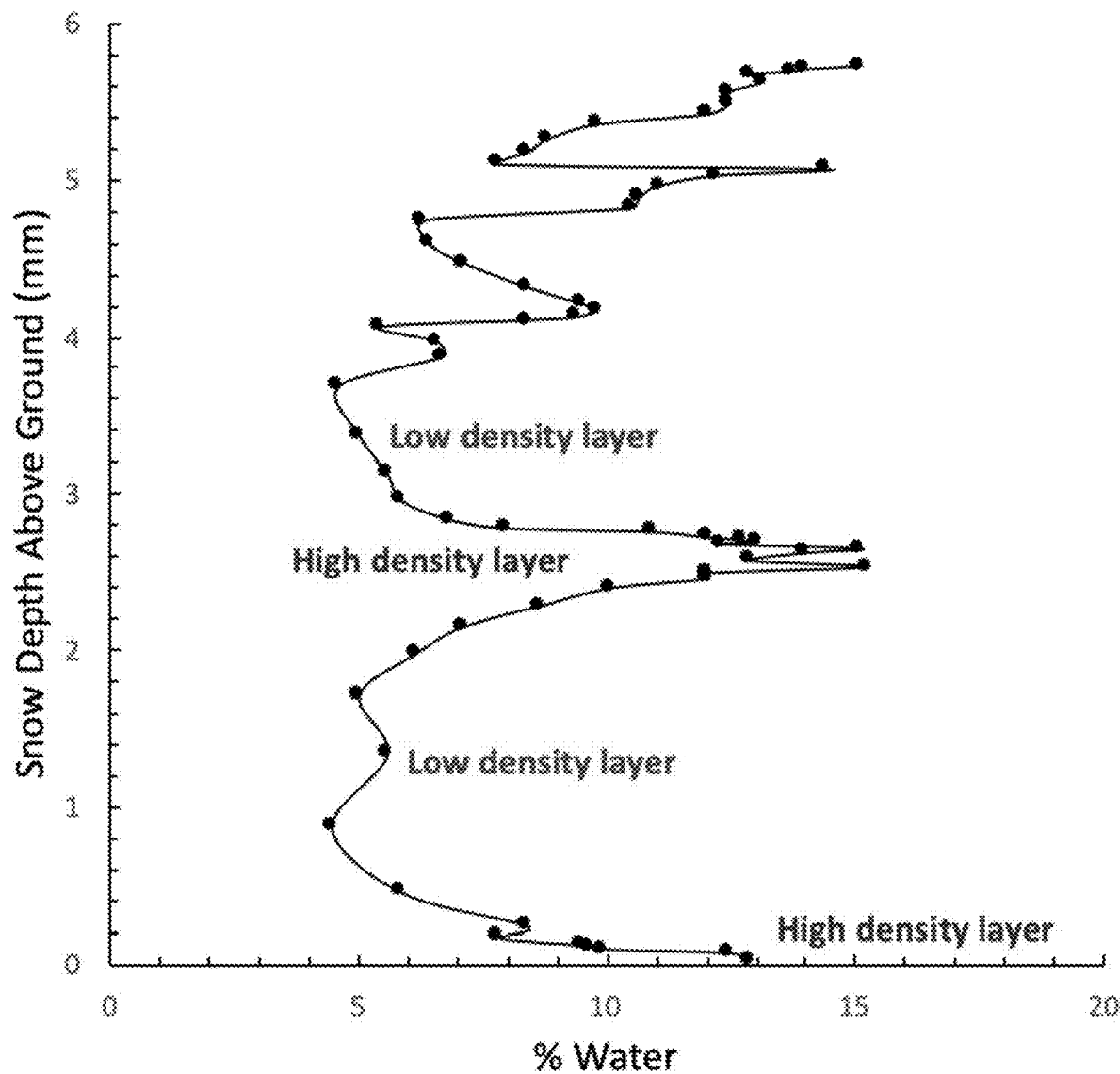
FIG. 15 is a graph of accumulation of snow above the ground measured using fall rate and density of snow.

FIG. 15 is a graph of accumulation of snow above the ground measured using fall rate and density of snow.

Figure 16C:
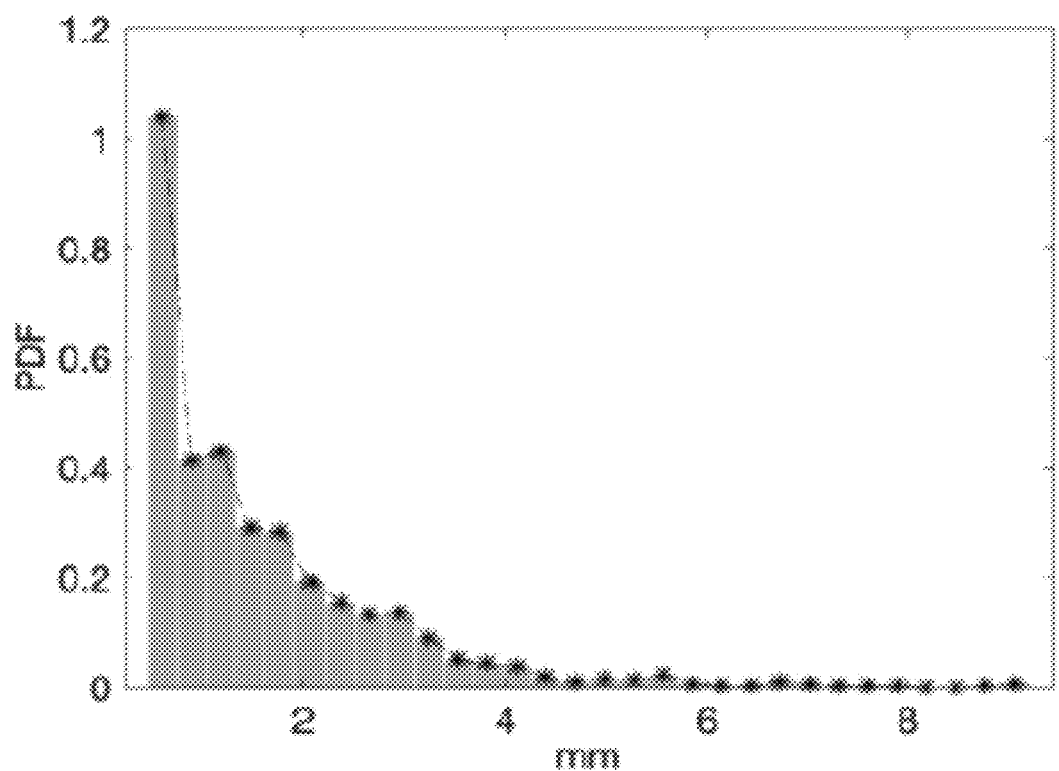
Figure 16D:
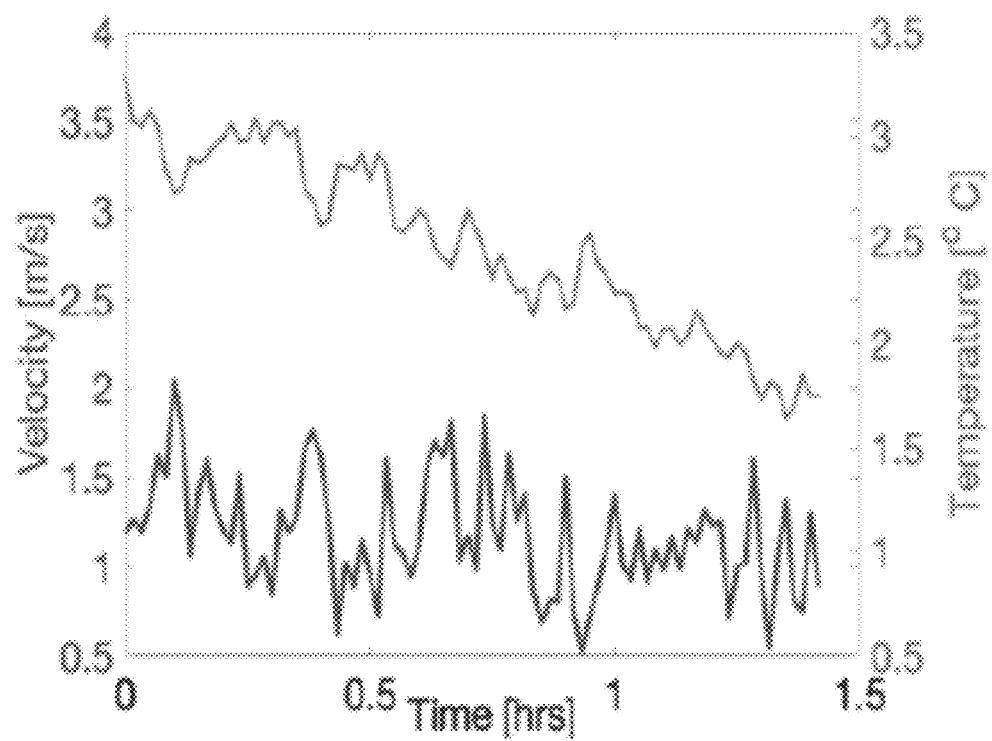

FIG. 16A-16D show tracking of snow particles. FIG. 16A is an image 0.4×0.3 m² field of view, path of snow particles is shown with four different color (white, red, green and cyan) and time interval between two colors is 1/60 sec. FIG. 16B is a graph of fall speed measured with respect to size of the snow particles. FIG. 16C is a graph of PDF plotted for snow particles with bin size 0.2. FIG. 16D is a 1 min window of the sonic anemometer data showing wind velocity (blue line) and air temperature (red line).

Example 2

A differential emissivity imaging device (DEID) was configured as in FIG. 4A to operate as a combined precipitation and wind sensor. A Thermal Image Velocimetry (TIV) method was applied to the DEID, which is based on the more general and known 2D planar Particle Image Velocimetry (PIV) method (see Particle Image Velocimetry: A Practical Guide, Raffel et al., 1998). Natural perturbations in air temperature associated with turbulent wind motions were then used to quantify horizontal windspeed and direction separate from stationary hydrometeors. The spatial shift of the 'image' yields a two-dimensional velocity that can then be correlated to actual wind speeds by breaking up interrogation regions consisting of blocks of thermal camera pixels and computing cross-correlation functions from temporally consecutive images using standard optimized FFT algorithms (Inagaki et al., 2013). Background subtraction was used to separate objects that are stationary or slowly varying on time scales much longer than wind perturbations (e.g., melting process associated with a hydrometeors). See also Piccardi, 2004 and Hung et al., 2014 for additional background on optimization and background subtraction.

Figure 17A:
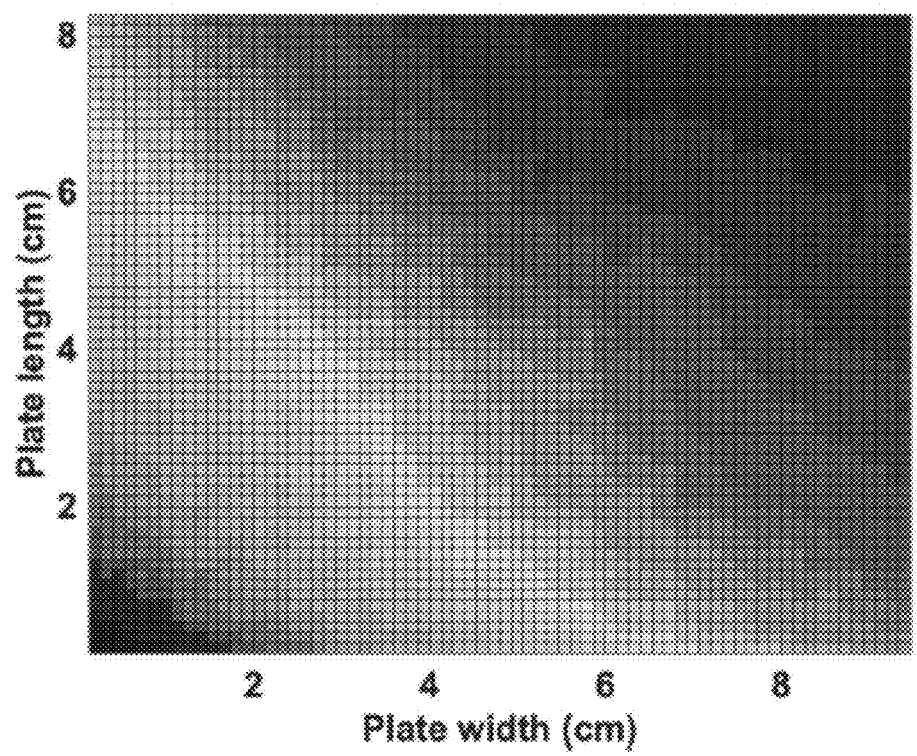
FIG. 17A-C are lab tests of the DEID measuring both hydrometeors and horizontal wind components using TIV.
Figure 17B:
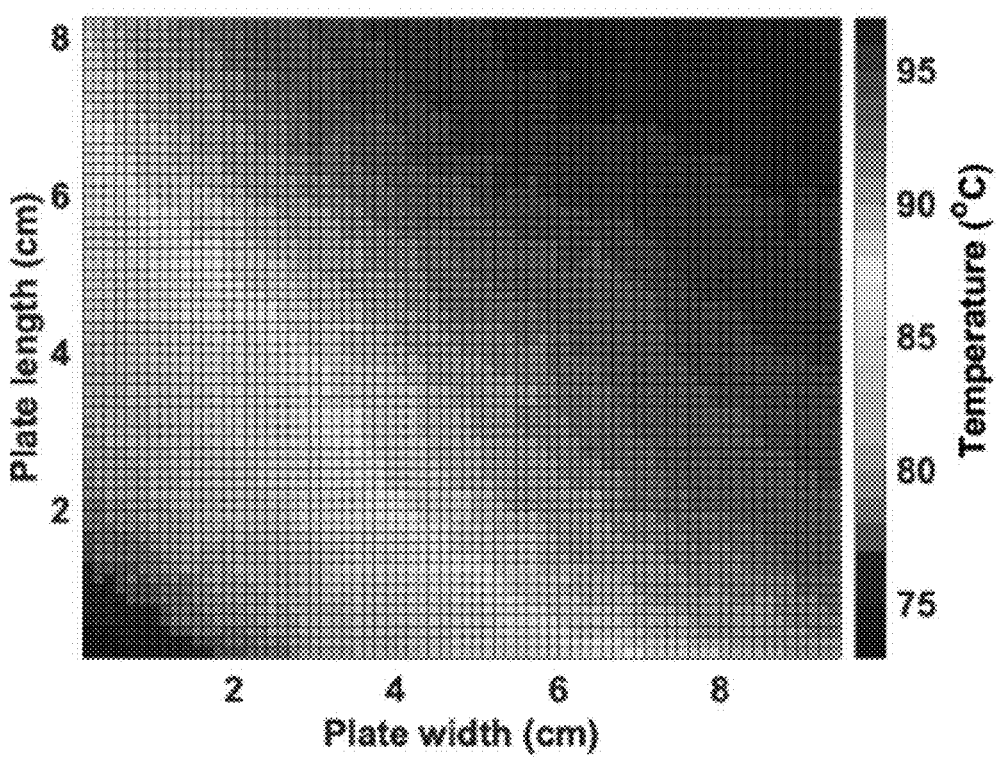
Figure 17C:
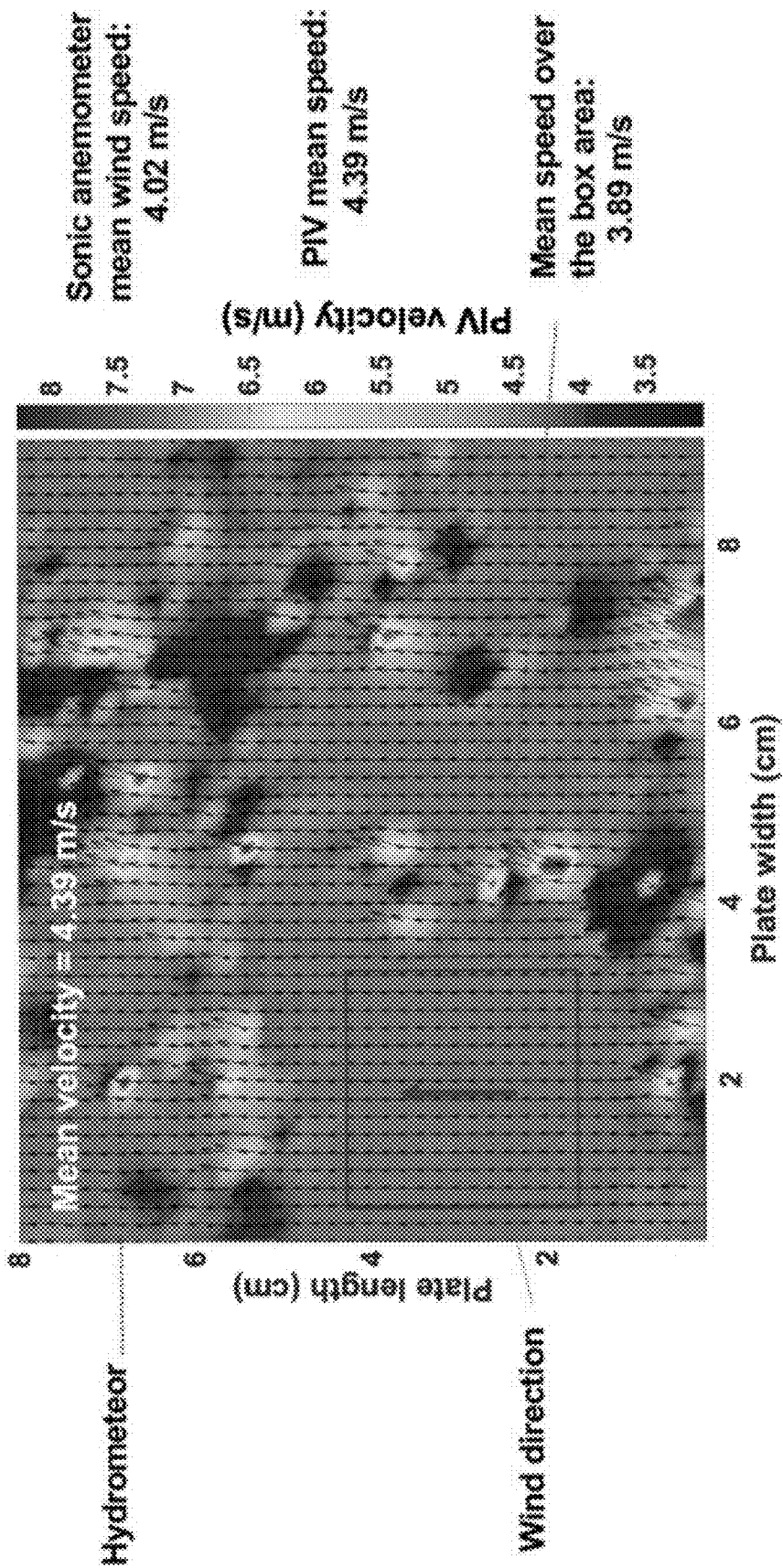

FIG. 17A-C are lab tests of the DEID measuring both hydrometeors and horizontal wind components using TIV. FIGS. 17A-B show the propagation of temperature perturbations across the DEID during a 1-s interval. Using TIV, hydrometeors were clearly separable from wind vectors, which are obtained from the displacement of the temperature perturbation field. The advection velocity across the plate can be correlated to the actual wind speed.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as illustrative rather than as restrictive, and all such modifications or changes, if any, are intended to fall within the scope of the present invention as described and set forth herein.

What is claimed is:

1. A differential emissivity imaging device for measuring evaporable particle properties, comprising:
   a) a heated plate with an upper surface oriented to receive falling evaporable particles, the evaporable particles having a particle emissivity and the upper surface having a plate surface emissivity;
   b) a thermal camera oriented to produce a thermal image of the upper surface;
   c) at least one memory device including instructions that, when executed by at least one processor, cause the imaging device to:
      i. identify individual evaporable particles from the thermal image by identifying differences between the particle emissivity and the plate surface emissivity,
      ii. determine a plate surface radiative temperature and a droplet radiative temperature as a function of a time until the droplet is evaporated,
      iii. determine a surface area of the droplet, and
      iv. calculate a mass of the individual evaporable particle via heat conduction using the surface area and the time; and
   d) an output interface to communicate the evaporable particle properties including the mass to an output device.

2. The imaging device of claim 1, wherein the upper surface is roughened to increase evaporation rate of the droplet.

3. The imaging device of claim 1, wherein the plate temperature is maintained below a Leidenfrost point during evaporation of the droplet.

4. The imaging device of claim 1, wherein the particle emissivity is at least 0.4 higher than the plate surface emissivity.

5. The imaging device of claim 1, wherein the mass is calculated using:

$$S\Delta T \int dm + L \int dm = \int_0^{\Delta t} (k/d) A(t)(T_p - T_w(t)) dt$$

where S is specific heat capacity of the droplet, ΔT is a temperature difference between an initial and final temperature of the droplet, m is mass of the droplet, L is latent heat of vaporization of the droplet, k is thermal conductivity of the plate, d is thickness of the plate, A(t) is plan area of the droplet as a function of time, $T_p(t)$ is the plate temperature, and $T_w(t)$ is surface temperature of the droplet as a function of time.

6. The imaging device of claim 1, further comprising an optical camera oriented to produce a plurality of optical images of falling evaporable particles above the heated plate.

7. The imaging device of claim 6, wherein the instructions further include at least one of:
   a) calculating fall speed from the plurality of optical images,
   b) determining an evaporable particle height prior to impact with the upper surface,
   c) determining a second comparative surface area of the droplet after impact of the evaporable particle with the upper surface, and
   d) calculating evaporable particle density using the evaporable particle height and the mass.

8. The imaging device of claim 7, wherein the instructions further include calculating at least one of:
   a) a precipitation flux using the mass and the fall speed,
   b) a precipitation rate using total mass loss per image frame, sampling frequency, and surface area of the heated plate,
   c) a number density using number of evaporable particles per unit volume, the fall speed, and time lapse,
   d) a visibility using a sum of cross-sectional area of evaporable particles on the heated plate, surface area of the heated plate, and an average fall velocity of the evaporable particles calculated from the fall speed, wherein the evaporable particles are hydrometeors, and
   e) a precipitation type using initial temperature drop of the heated plate.

9. The imaging device of claim 8, wherein the precipitation rate is calculated as:

$$\frac{\Delta m v}{\rho A}$$

where $\Delta m$ is total mass loss of hydrometeors for a single thermal image, v is sampling frequency, p is density of water, and A is surface area of the heated plate.

10. The imaging device of claim 8, wherein the visibility is 3.912/Q where $$Q = \frac{2 \Sigma A}{A_p v_p t}$$

where A is cross sectional area of all hydrometeors on the heated plate at a sample time, $A_p$ is the area of the heated plate, v is average fall speed of hydrometeors at the sample time, and t is the sample time.

11. The imaging device of claim 7, wherein the fall speed is calculated by forming a light sheet perpendicular to an imaging axis of the optical camera.

12. The imaging device of claim 1, wherein the output interface is a display or a data connection.

13. The imaging device of claim 1, comprising:
   at least one memory device including instructions that, when executed by the at least one processor, cause the imaging device to:
      i. identify changes in temperature of the upper surface as a function of time, and
      ii. calculate a wind speed and optionally a wind direction via heat convection using the plate temperature, and a surface area; and
   an output interface to communicate the wind speed and optionally the wind direction to an output device.

14. The imaging device of claim 13, wherein the wind speed is calculated via thermal image velocimetry.

15. The imaging device of claim 14, wherein wind direction and turbulent variability are also calculated via thermal image velocimetry.

16. The imaging device of claim 13, wherein the plate surface emissivity is a low emissivity.

* * * * *